(12) United States Patent
Zamer

(10) Patent No.: US 9,947,036 B2
(45) Date of Patent: Apr. 17, 2018

(54) GIFT SUGGESTION SYSTEM

(71) Applicant: PAYPAL, INC., San Jose, CA (US)

(72) Inventor: Kamal Zamer, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 677 days.

(21) Appl. No.: 14/495,440

(22) Filed: Sep. 24, 2014

(65) Prior Publication Data

US 2016/0086249 A1 Mar. 24, 2016

(51) Int. Cl.
*G06Q 30/00* (2012.01)
*G06Q 30/06* (2012.01)
*G06Q 50/00* (2012.01)
*G06Q 30/02* (2012.01)

(52) U.S. Cl.
CPC ..... *G06Q 30/0631* (2013.01); *G06Q 30/0201* (2013.01); *G06Q 30/0251* (2013.01); *G06Q 30/0261* (2013.01); *G06Q 30/0267* (2013.01); *G06Q 30/0623* (2013.01); *G06Q 30/0633* (2013.01); *G06Q 30/0639* (2013.01); *G06Q 50/01* (2013.01)

(58) Field of Classification Search
CPC ............... G06Q 30/06; G06Q 30/0631; G06Q 30/0633; G06Q 30/0251; G06Q 30/0267; G06Q 30/0623; G06Q 30/0639; G06Q 50/01
USPC ...... 705/26.1–27.2, 14.49, 14.58, 14.64, 319
See application file for complete search history.

(56) References Cited

U.S. PATENT DOCUMENTS

| 9,117,236 B1* | 8/2015 | Feinstein | G06Q 30/02 |
| 2009/0216549 A1* | 8/2009 | Causey | G06Q 30/02 705/26.1 |
| 2010/0100455 A1* | 4/2010 | Song | G06Q 30/0253 705/26.1 |
| 2014/0258021 A1* | 9/2014 | Akin | G06Q 30/0631 705/26.7 |
| 2016/0012491 A1* | 1/2016 | Shah | G06Q 30/0269 705/14.58 |
| 2016/0043924 A1* | 2/2016 | Cejnar | G06F 11/3006 709/224 |

OTHER PUBLICATIONS

Amazon Launches New Applications on Facebook(R) Platform—"Amazon Giver" and "Amazon Grapevine" Let Facebook Users Share and Buy Products Their Friends Want from Amazon.com; Business Wire, Mar. 13, 2008 (Mar. 13, 2008). Accessed via ProQuest (Year: 2008).*

* cited by examiner

*Primary Examiner* — Resha Desai
*Assistant Examiner* — Allison G Wood
(74) *Attorney, Agent, or Firm* — Haynes and Boone, LLP

(57) ABSTRACT

Systems and methods for suggesting gifts include associating a first item identifier with a first user in a database in response to receiving at least one implicit action by the first user that is directed to a first item having a first item type that is identified by the first item identifier. A second user device of a second user is then detected as located at a physical merchant location. An association between the first user and the second user is then retrieved. In response to the first user being associated with both the second user and the first item identifier in the database, that the first item type that is identified by the first item identifier is determined to be available at the physical merchant location. A gift suggestion is then provided for display on the second user device that identifies the first user and the first item type.

20 Claims, 18 Drawing Sheets

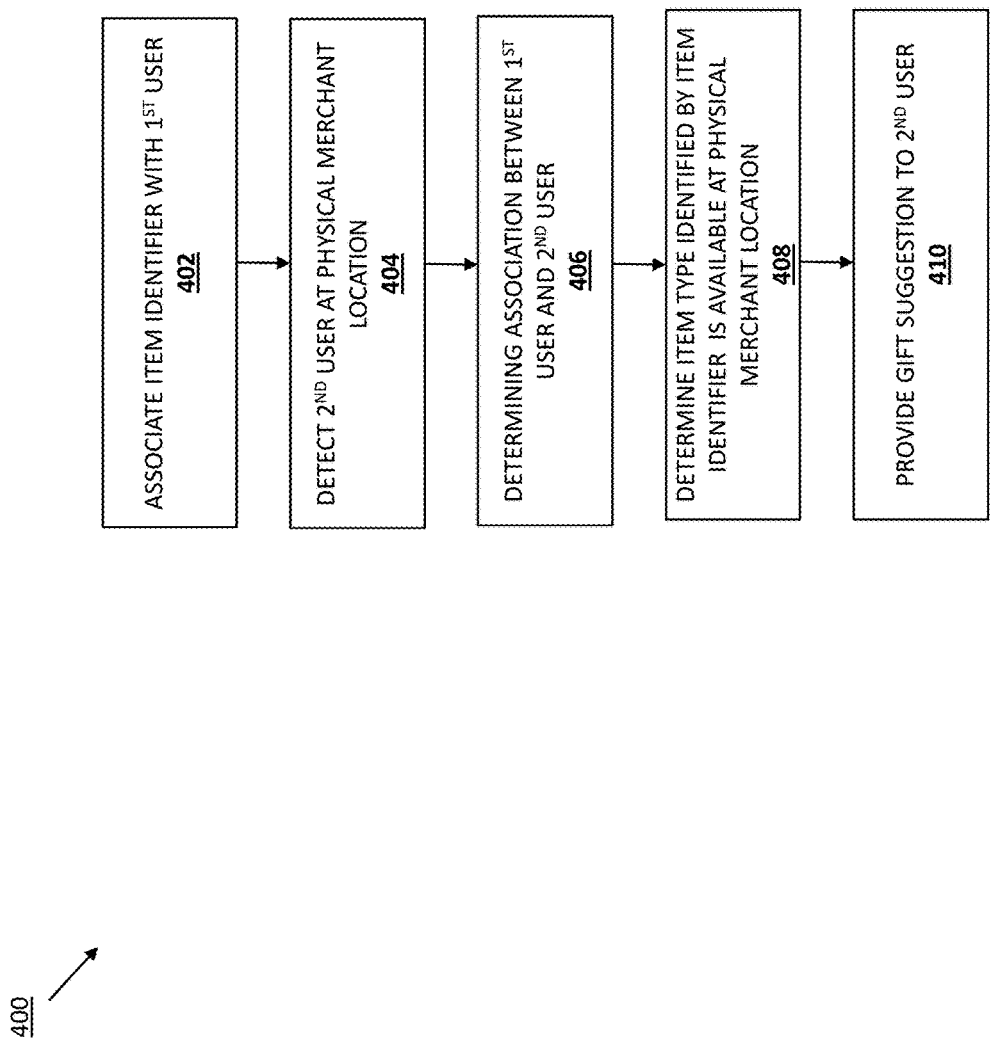

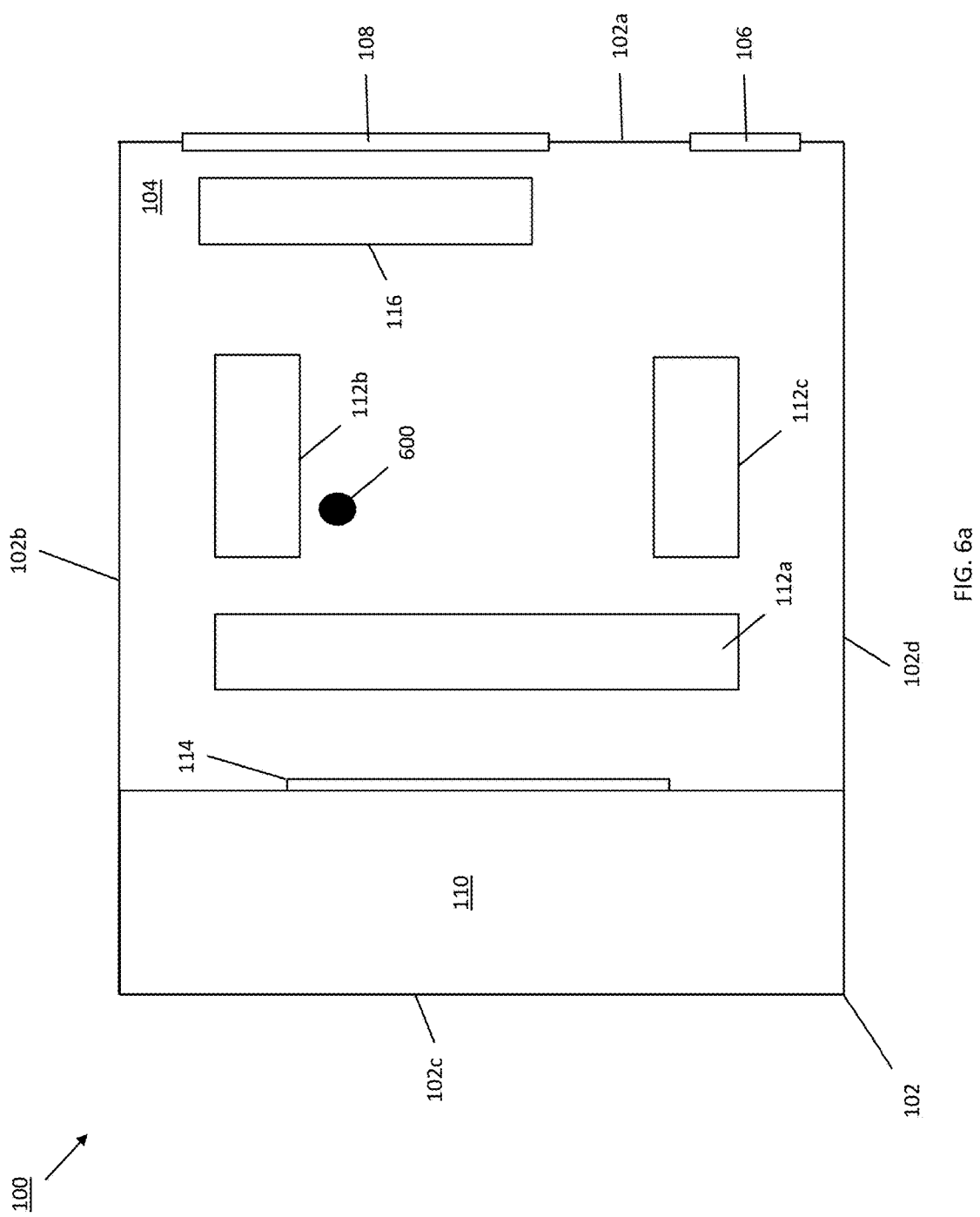

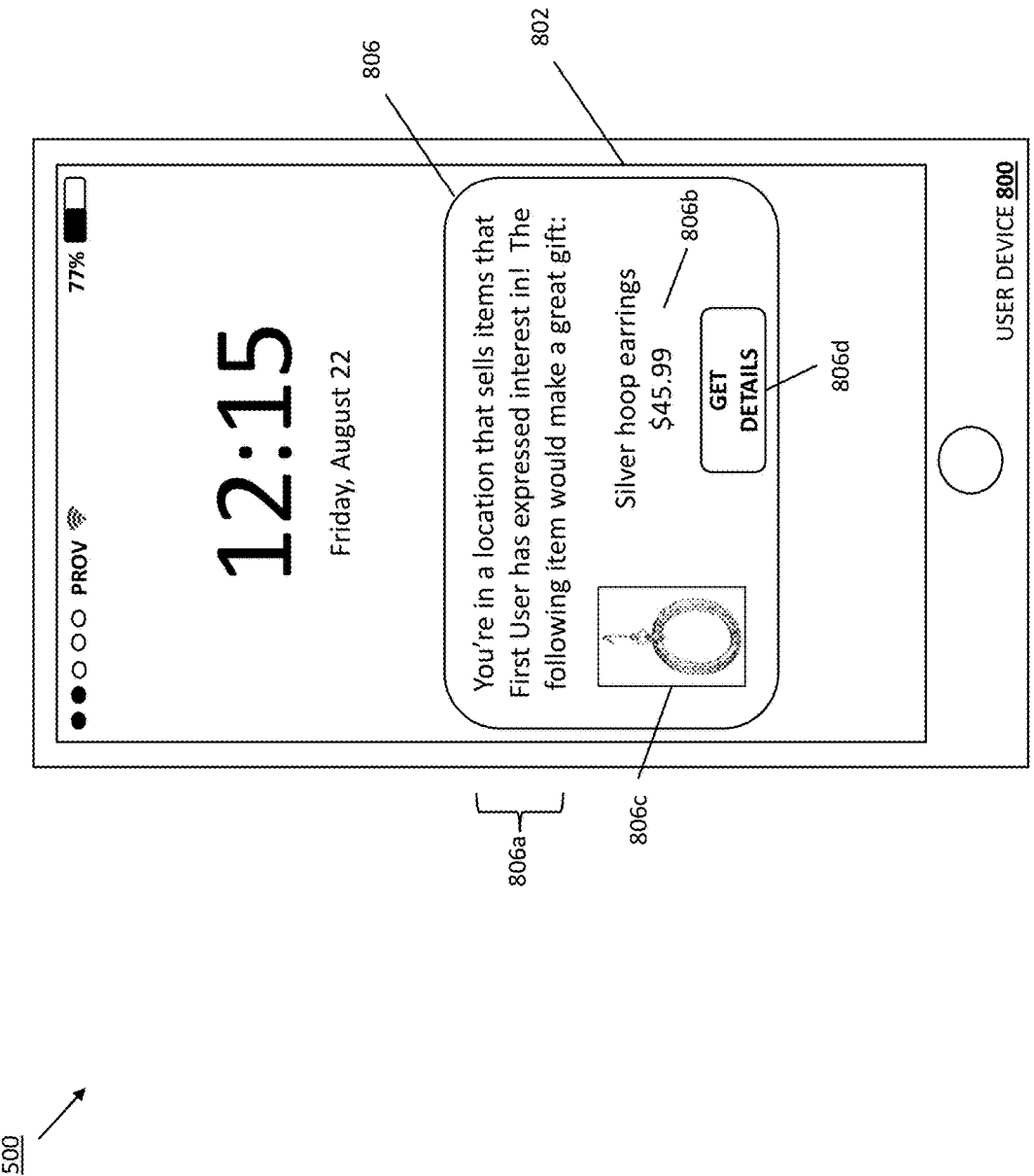

GIFT SUGGESTION SYSTEM

BACKGROUND

Field of the Disclosure

The present disclosure generally relates to online and/or mobile payments and more particularly to a gift suggestion system utilizing online and/or mobile payments.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why online and mobile purchases are growing very quickly.

One area in which online and mobile payment may be utilized is in purchasing gifts for other people (i.e., gift receivers). Conventionally, purchasing gifts for gift receivers requires that the gift giver research items for purchase, guess which of those items that the gift receiver would enjoy, and purchase that item for the gift receiver. However, such conventional methods of purchasing gifts are time consuming for the gift giver and inaccurate with regards to selecting items that the gift receiver might enjoy. As such, gift givers may spend a significant amount of time finding gifts for gift receivers, and many of those gifts will still be returned by the gift receivers to the merchant from which they were purchased. Attempts to remedy this situation have included gift receivers providing a gift registry at a specific merchant, such as, for example, a wedding gift registry at a home furnishings merchant. This allows gift givers to check the gift registry for gifts to buy for the gift receiver from the specific merchant. However, such gift registries are typically only provided for special occasions (e.g., weddings, following the birth of children, etc.), and thus such solutions only address situations where the gift receiver explicitly provides the items they would like from a specific merchant for a specific occasion. As such, gift giving on non-special occasions to gift receivers that have not explicitly designated which items they would like from a specific merchant still suffers from the issues discussed above.

Thus, there is a need for an improved gift giving system.

BRIEF DESCRIPTION OF THE FIGURES

FIG. 4 is a flow chart illustrating an embodiment of a method for providing gift suggestions;

FIG. 6a is a schematic top view illustrating an embodiment of a user located at the physical merchant location of FIG. 1;

FIG. 8b is a screen shot illustrating an embodiment of a user device displaying a gift suggestion screen;

Figure 1:
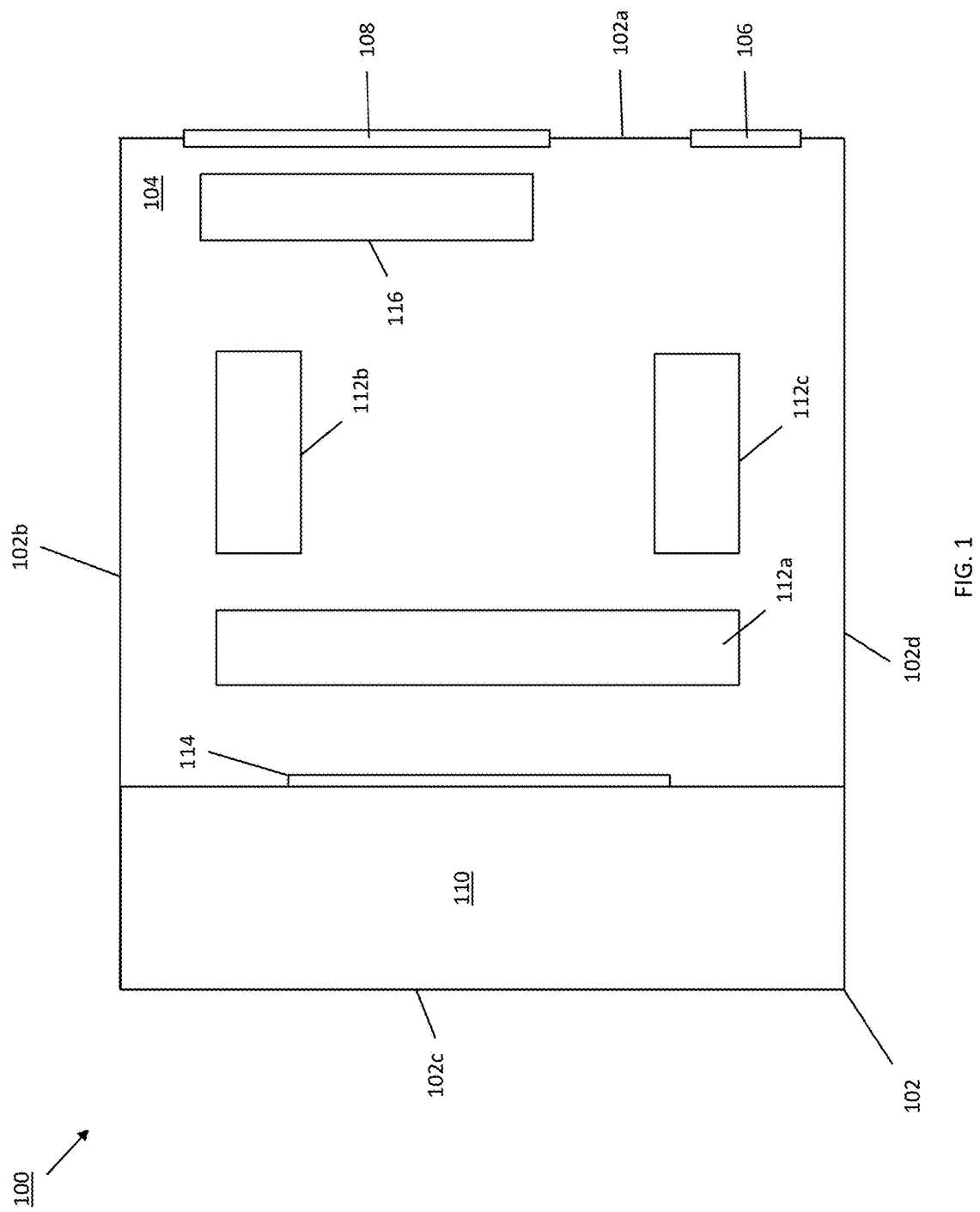
FIG. 1 is a schematic top view illustrating an embodiment of a physical merchant location.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for suggesting gifts to a second user for purchase for a first user. The first user may be associated with an item identifier in a database based on one or more implicit actions by the first user with an item having an item type that is identified by the item identifier. When the second user enters a physical merchant location, that second user may be detected at the physical merchant location through a second user device of the second user. The second user may then be determined to be associated with the first user in the database based on a variety of user-association characteristics such as, for example, a user-designated association, a social network connection, etc. In response to determining that the first user and the second user are associated in the database, the item identifier associated with the first user is retrieved and it is determined whether the item type identified by that item identifier is available at the physical merchant location. If that item type is available at the physical merchant location, a gift suggestion may be provided to the second user that identifies the first user and the item type. As such, first users may be associated with item identifiers based on implicit actions that indicate that the first user is interested in item types identified by those item identifiers, and when second users that are friends with those first users enter a physical merchant location that provides those item types, those second users are provided gift suggestions for their first user/friend that identify the item types they should purpose at the physical merchant location for their first user/friend.

Referring now to FIG. 1, an embodiment of a physical merchant location 100 is illustrated. The physical merchant location 100 illustrated in FIG. 1 is provided as just one example of a location that may provide items and/or item types, and as discussed below the gift suggestion system of the present disclosure will be beneficial for a wide variety of other types of locations. The physical merchant location 100 includes a merchant building 102 having a plurality of exterior walls 102a, 102b, 102c, and 102d that define a physical merchant location interior 104. The exterior wall 102a includes an exterior door 106 (e.g., a "front" door in the illustrated embodiment) and an exterior window 108. In the illustrated embodiment, the physical merchant location interior 104 includes a merchant employee area 110, a plurality of counters 112a, 112b, and 112c, a product display 114 located behind the counter 112, and a product display 116 located adjacent the exterior window 108. One of skill in the art in possession of the present disclosure will recognize that the physical merchant location 100 is just one of a plurality of different types of locations (including non-physical merchant locations such as, for example, merchant websites in some embodiments) where the gift suggestion system discussed below may be utilized while remaining within the scope of the present disclosure.

In a specific example provided below, the physical merchant location 100 is a jewelry store, the merchant employee area 110 is a jewelry inventory storage, the counters 112a, 112b, and 112c are jewelry display counters, the product display 114 is one or more jewelry advertisements, and the product display 116 is an external jewelry display (i.e., through the exterior window 108). In another example, the physical merchant location 100 may be a clothing store, the merchant employee area 110 a clothing stock room, the counters 112a, 112b, 112c are displays for clothing accessories for purchase, the product display 114 a clothing advertisement for one or more clothing products available at the physical merchant location 100, and the product display 116 is an external clothing display (i.e., through the exterior window 108). However, while a few examples of physical merchant locations are provided herein, locations at which gifts are suggested may include any location (physical or virtual) that offers items for purchase.

Figure 2:
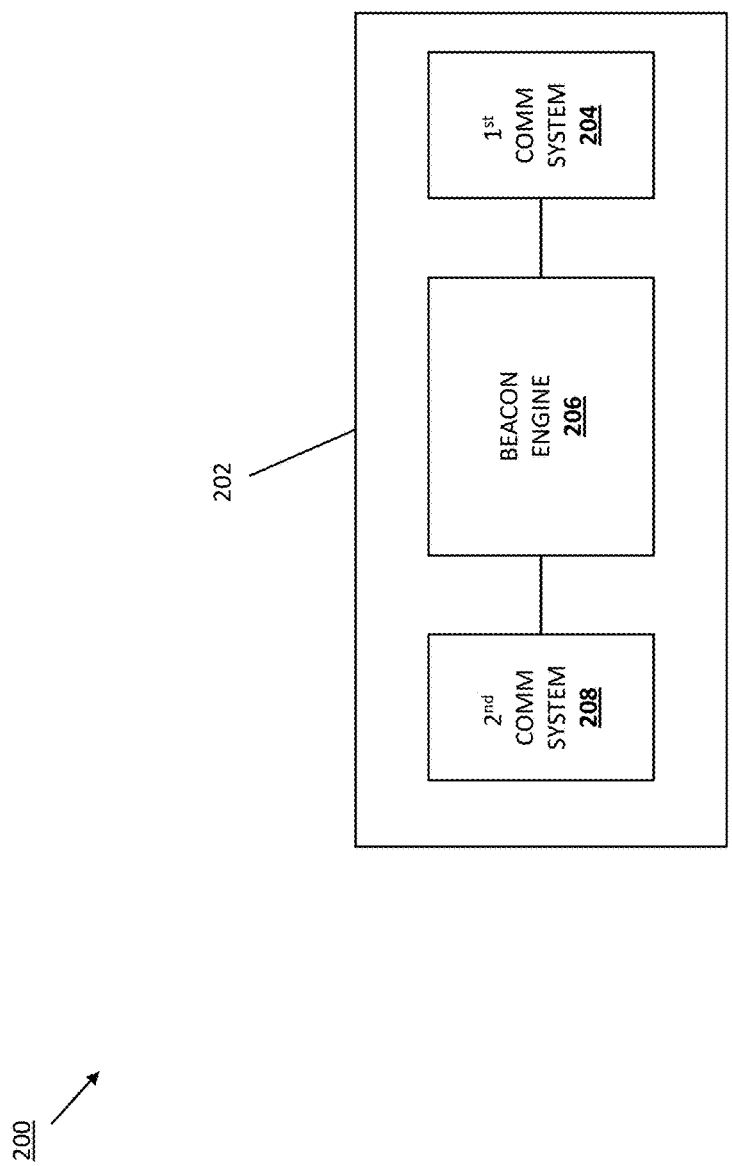
FIG. 2 is a schematic view illustrating an embodiment of a beacon device.

Referring now to FIG. 2, an embodiment of a beacon device 200 is illustrated. The beacon device 200 includes a chassis that houses a first communications system 204 such as, for example, a Wifi communications system. The first communications system 204 is coupled to a beacon engine 206 that may be provided by instructions on a memory system (not illustrated) in the beacon device 200 that, when executed by a processing system (not illustrated) in the beacon device 200, causes the processing system to perform the functions of the beacon devices 200 discussed below. The beacon engine 206 is coupled to a second communication system 208 such as, for example, a Bluetooth communication system, a Bluetooth® Low Energy (BLE) communication system, a near field communication (NFC) system, and/or a variety of other communication systems known in the art. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device to be provided in a relatively small form factor such that it may be placed inconspicuously almost anywhere. The chassis 202 of the beacon device 200 may include any of a variety of features that allow for the coupling of the beacon device to different areas in a physical merchant location, discussed below.

Figure 3A:
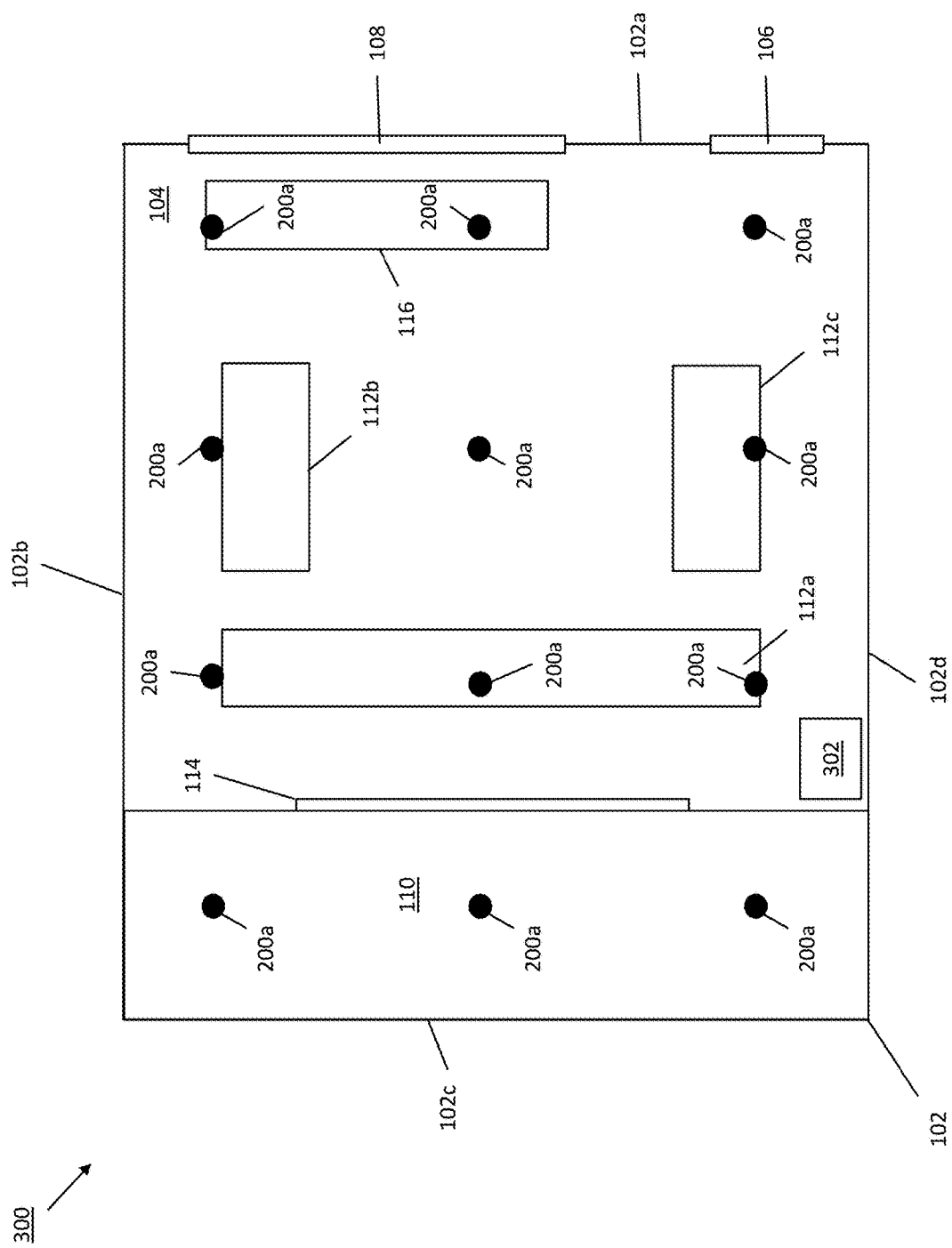
FIG. 3a is a schematic top view illustrating an embodiment of a gift suggestion system that includes a plurality of the beacon devices of FIG. 2 in the physical merchant location of FIG. 1.
Figure 3B:
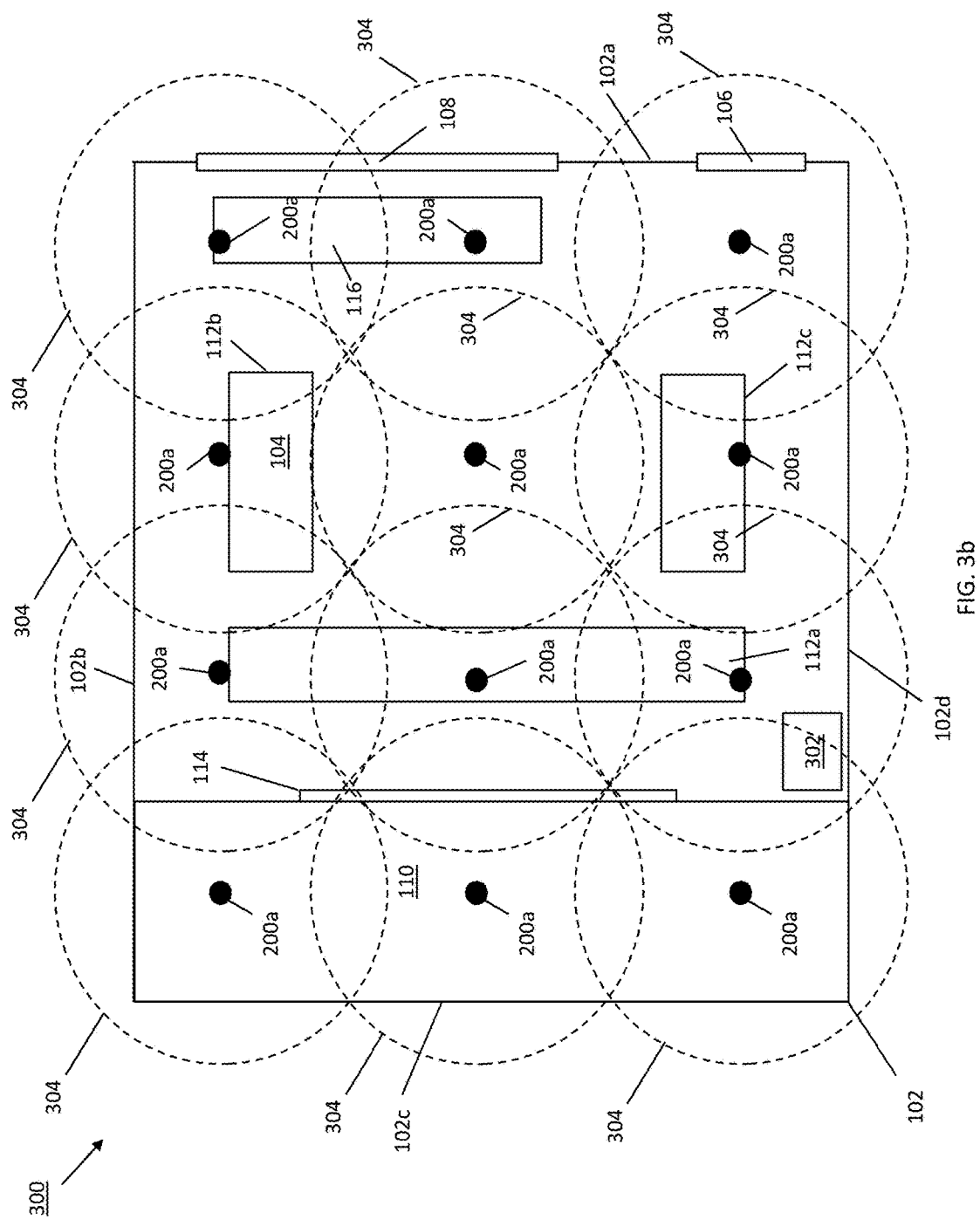
FIG. 3b is a schematic top view illustrating an embodiment of the gift suggestion system of FIG. 3a with the beacon devices providing communication areas.

Referring now to FIGS. 3a and 3b, an embodiment of a portion of a gift suggestion system 300 is illustrated. As illustrated in FIG. 3a, the gift suggestion system 300 may be provided, at least in part, by positioning a plurality of the beacon devices 200, discussed above with reference to FIG. 2, in and around the physical merchant location 100, discussed above with reference to FIG. 1. In the illustrated embodiment, a plurality of beacon devices 200a are positioned in and around the physical merchant location 100. As discussed above, the beacon devices 200 may be sized such that they may be inconspicuously positioned virtually anywhere in or around the physical merchant location 100. For example, the beacon devices 200a may be positioned on the ceiling of the physical merchant location 100, in the product display counter 112, and in the product display 116. Each of the beacon devices 200 in the application provisioning system 300 may be configured to wirelessly communicate, via its first communications system 204, with a merchant network communication device 302 such as, for example, a Wifi wireless router connected to a network such as the Internet, a server, and/or other computing system known in the art.

Referring now to FIG. 3b, in operation, each of the beacon devices 200 is configured to create a communication area 304 with its second communications system 204. For example, the second communications system 204 in each beacon device 200 may be a BLE communications device that provides an approximately 100 foot radius communications area. However, other communications systems providing other communications areas are envisioned as falling within the scope of the present disclosure. As can be seen in the illustrated embodiment, the beacon devices 200 may be positioned in and around the physical merchant location 100 such that the communications areas 304 abut, overlap, or otherwise provide coverage for any area of interest within and around the physical merchant location 100. As such, one of skill in the art in possession of the present disclosure will appreciate that different configurations of the beacon devices 200 within and around the physical merchant location 100 may be selected to cover any area within and around the physical merchant location 100 with a communications area 304. As discussed in further detail below, each of the beacon devices 200 are configured to communicate with user devices within their respective communications area 304 (e.g., using the second communication system 208) to collect data, and then send that data to the merchant network communication device 302 (e.g., using the first communication system 204) such that the data may be provided to a merchant device, a system provider device, and/or any other device operating to provide the gift suggestions discussed below. One of skill in the art will recognize that the use of BLE communication devices for communication between the beacon devices 200a and user devices may be utilized to provide for low power communications in the background of a user device (e.g., when the user device is not being actively used by the user).

In the embodiments illustrated and discussed below, the beacon devices 200 and their communications areas 304 are not illustrated for clarity of illustration and discussion, but it should be understood that the communications and retrieval of information from beacon communication devices, and in some cases the provision of that information to a system provider device, may be accomplished using beacon devices providing communications areas such as the beacon devices 200 and communications areas 304 illustrated in FIGS. 3*a* and 3*b*. However, in some embodiments, the beacon devices 200*a* may be omitted from the gift suggestion system 300 and any communications between the user devices, the merchant devices, and/or the system provider devices may be provided over other networks (e.g., Local Area Networks (LANs), the Internet, etc.) via other communications technologies (e.g., Bluetooth, NFC, Wi-Fi, etc.). Thus, while a specific example of an application provisioning system 300 using beacon devices is provided, one of skill in the art in possession of the present disclosure will recognize that gifts may be suggested according to the teachings of the present disclosure using a wide variety of other communication systems while remaining within the scope of the present disclosure.

FIGS. 1, 3*a*, and 3*b* illustrate a physical merchant location 100 that is a single building, and the beacon devices 200 are positioned to provide communications areas 304 that cover the interior of that single building and an area outside the front of that single building. However, beacon devices 200 may be positioned virtually anywhere to retrieve information associated with a physical merchant location 100. For example, the physical merchant location 100 may be located adjacent to or associated with a parking lot, and beacon devices may be positioned around that parking lot, at the entrances or exits of that parking lot, and/or anywhere else relative to that parking lot in order to collect and send information from beacon communication devices to the system provider device. In another example, the physical merchant location may be located in a mall, and beacon devices may be positioned around that mall, at the entrances or exits of that mall, and/or anywhere else relative to that mall in order to collect and send information from beacon communication devices to the system provider device. In some examples, the first communication system may be connected to Wifi networks available outside the physical merchant location in order to communicate collected information to a system provider device. In other examples, the first communication system may be a cellular communications system that allows the beacon devices to be positioned anywhere in range of a cellular communications tower, allowing beacon devices in the merchant to be positioned in virtually any physical location when providing the gift suggestion system.

Referring now to FIG. 4, an embodiment of a method 400 for suggesting gifts is illustrated. In the embodiments discussed below, the method 400 is performed by a system provider that is a payment service provider such as, for example, PayPal Inc. of San Jose, Calif., that operates a system provider device that is a payment service provider device. For example, the payment service provider may provider payment services for users and merchant to allow users to make purchases from merchants by transferring funds from user payment accounts to merchant payment accounts, and the payment service provider may provide the gift suggestion system as part of those payment services. However, other system providers (e.g., account providers, third party providers, etc.) may provide the gift suggestion system as part of other services and/or as a stand-along service while remaining within the scope of the present disclosure.

In some embodiments, the user devices discussed below may include a gift suggestion application and/or payment application that operates to cause those user devices to perform the functions discussed below for participating in the gift suggestion system. As such, any actions associated with the gift suggestion system including associating users with item identifiers, detecting users at physical merchant locations, determining item types available at physical merchant locations, and providing gift suggestions for display, may be performed by or in conjunction with the operation of the gift suggestion application on the user device.

Figure 5:
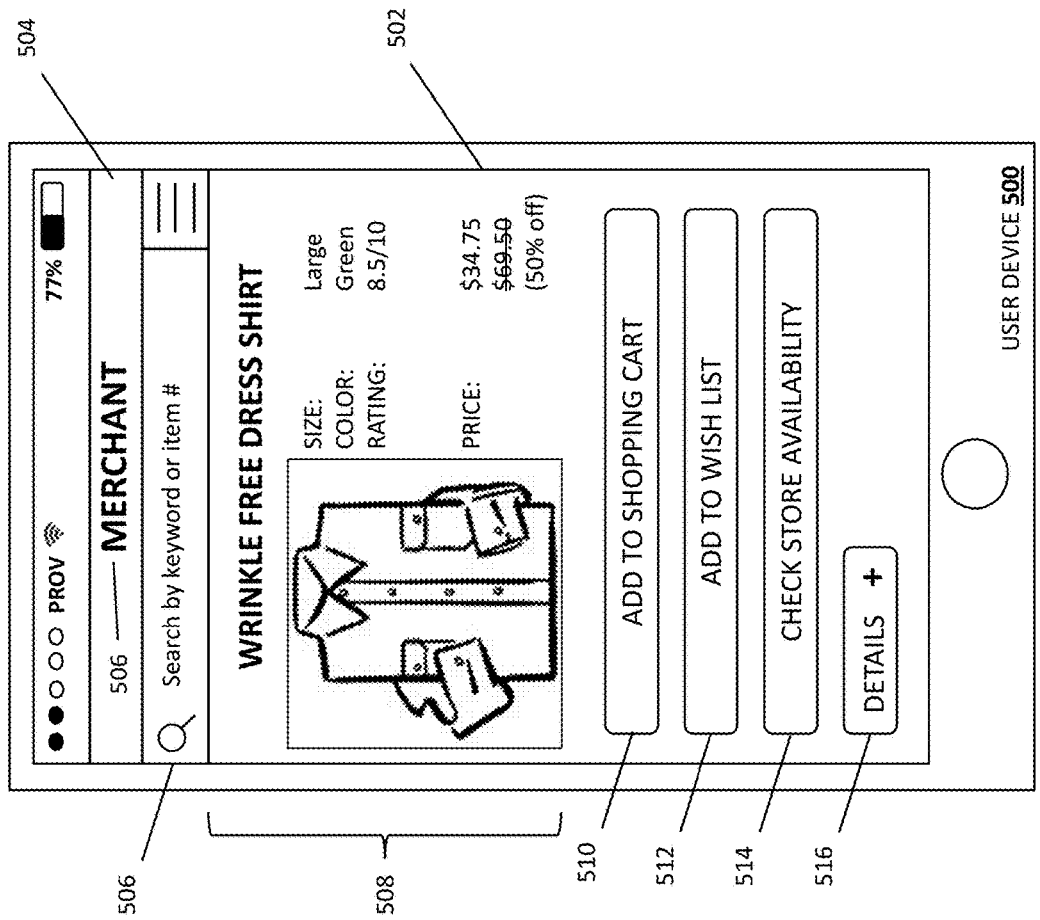
FIG. 5 is a screen shot illustrating an embodiment of a user device displaying an item viewing screen.
Figure 6B:
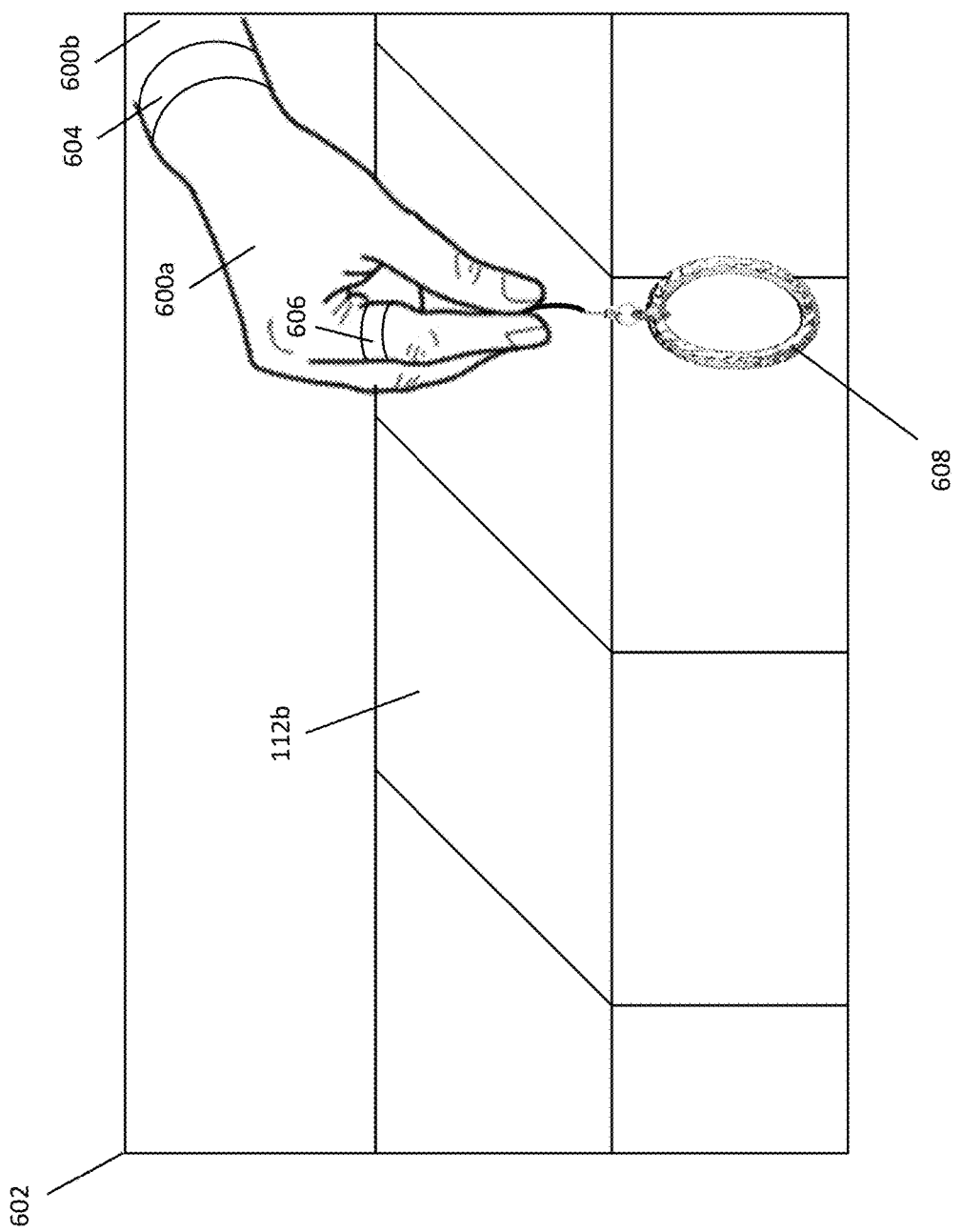
FIG. 6b is a user first-person view illustrating an embodiment of the user handling items at the physical merchant location of FIG. 1.

The method 400 begins at block 402 where an item identifier is associated with a first user. FIGS. 5, 6*a*, and 6*b* below provide illustrations of a few examples of the association of a first user with an item identifier. However, as discussed below, any of a variety of techniques for associating a first user with an item identifier are envisioned as falling within the scope of the present disclosure, and combinations of those techniques may be utilized to determine whether an association between a first user and an item identifier is appropriate or otherwise accurately indicates an interest by the first user in an item type identified by an item identifier.

Referring now to FIG. 5, an embodiment of a user device 500 is illustrated that includes a display 502 displaying an item viewing screen 504. In the embodiment discussed below, the user device 500 is a first user device that is operated by a first user (a gift receiver), and the item viewing screen 504 is utilized to detect actions by the first user that are directed to items such that item identifiers that identify the item type of those items may be associated with the first user. In the illustrated embodiment, the item viewing screen 504 includes a merchant identifier 506, a search area 506 that allows a user to search for items provided by the merchant, a viewed item section 508 that includes an image and item details (size, color, user rating, price, etc.) about an item selected for viewing by the first user, an add to cart button 510 that the first user may select to proceed with purchasing the viewed item, an add to wish list button 512 that the first user may select to save the viewed item for possible later purchase or otherwise indicate interested in the viewed item, a check store availability button 514 that the first user may select to check the availability of the viewed item at the merchant, and a details button 516 that the first user may select to get further details about the viewed item. One of skill in the art in possession of the present disclosure will recognize that the item viewing screen 504 may be any of a variety of item screens provided on webpages of merchant websites provided by merchants (e.g., the merchant identified by the merchant identifier 506).

In some embodiments, the item viewing screen 504 may be used to detect explicit actions by the first user that are directed to items and that result in an item identifier that is associated with an item type of the item being associated with the first user. For example, when viewing the item in the viewed item section 508 of the item viewing screen 504, the first user may select the add to wish list button 512 to explicitly indicate an interest in the viewed item such that an item identifier that identifies an item type of the item is associated with the first user in a database. In one embodiment, selection of the add to wish list button 512 results in any information available about the item in the viewed item section 508 being sent from the user device 500 to the system provider device over the network, and an association module included in the system provider device associating an item identifier that identifies the item type of that item with the first user in a storage module such as, for example, a database. In some examples, the item type identified by the item identifier may include any details about the item that was specifically viewed by the first user including, for example, the size, color, user rating, price, and/or other item type information. As discussed below, that item type information may be used to identify the same item at a merchant and/or similar items at a merchant.

In some embodiments, the item viewing screen 504 may be used to detect implicit actions by the first user that are directed to items and that result in an item identifier that identifies an item type of the item being associated with the first user. For example, the viewing of the item in the viewed item section 508, by itself, may be an implicit action by the first user that is directed to the viewed item and that results in an item identifier for the viewed item being associated with the first user. Characteristics of the viewing of the item that result in an associated item identifier being associated with the first user may include viewing the item a predetermined number of times, viewing the item for a predetermined amount of time, viewing a predetermined number of items that have the same item type as the viewed item (e.g., a dress shirt), and/or a variety of other viewing characteristics known in the art. Any viewing information and characteristics may be sent by the user device 500 the system provider device over the network, and then analyzed by the association module included in the system provider device to determine an item identifier to associate with the first user in the storage module. In some examples, the item type identified by that item identifier may include any details about the item that was viewed by the first user including, for example, the size, color, user rating, price, and/or other item type information. As discussed below, that item type information may be used to identify the same item at a merchant and/or similar items at a merchant.

In another example, other actions associated with the item in the viewed item section 508 may be implicit actions by the first user that are directed to the viewed item and that results in an item identifier for the viewed item being associated with the first user. In a specific example, selection of the add to cart button 510 without a subsequent purchase of the item by the first user may be an implicit action by the first user that is directed to the item and that results in an item identifier for the item being associated with the first user. Similarly, selection of the check availability button 514 and/or the details button 516 without a subsequent purchase of the item by the first user may be an implicit action by the first user that is directed to the item and that results in an item identifier for the item being associated with the first user. Any information about an item associated with an implicit action may be sent by the user device 500 the system provider device over the network, and then analyzed by the association module included in the system provider device to determine an item identifier to associate with the first user in the storage module. In some examples, the item type identified by that item identifier may include any details about the item that was added to the cart but not purchased by the first user including, for example, the size, color, user rating, price, and/or other item type information. As discussed below, that item type information may be used to identify the same item at a merchant and/or similar items at a merchant.

In yet another embodiment, implicit actions toward an item may include attempting and failing to purchase those items. For example, the first user may bid on an item available from a merchant at an online auction website such as, for example, EBay.com provided by EBay, Inc. of San Jose, Calif. In response to determining that a user has bid on an item and lost (e.g., been outbid by another user for that item), the association module in the system provider device may associated an item identifier identifying the item type for that item with the first user in the storage module. Furthermore, the closer the first users bid is to the item without winning that item, the more bids the first user makes on the item, and/or other data associated with item bidding known in the art, the higher the degree of confidence may be in the first user's interest in that item and thus the association of the first user with that item. Similarly, other failed purchasing actions (e.g., attempting to purchase an item that is not in stock) may be used to determine the first user's interest in an item and thus result in the association of an item identifier with that user.

Thus, online viewing and/or other actions performed by the first user through a web page or website may be provided to the system provider device and analyzed by the association module included in the system provider device to determine item identifiers to associate with the first user that identify items types of items that the first user has expressed some degree of interest in. While several examples of techniques have been provided that allow a determination to be made of the interest of the first user in an item, one of skill in the art in possession of the present disclosure will recognize that a wide variety of other user viewing and/or other actions on item webpages and merchant websites may be utilized to determine user interest in one or more items or item types while remaining within the scope of the present disclosure.

Referring now to FIGS. 6a and 6b, an embodiment of a first user 600 entering the physical merchant location 100 is illustrated. In the embodiment discussed below, the physical merchant location 100 is a jewelry store, and the first user 600 includes a first user device (e.g., a mobile phone) as well as one or more wearable user devices (e.g., "smart" glasses, watches, rings, etc.) that are utilized to detect and/or report actions by the first user that are directed to items such that item identifiers that identify the item type of those items may be associated with the first user. Any of the user devices of the first user 600 may be configured to communicate with each other as well as with the merchant and system provider through merchant network communication device 302 via, for example, the beacon system discussed above and/or other communications systems known in the art. As such, upon entering the physical merchant location 100, the user device(s) of the first user 600 may communicate with each other, the merchant, and/or the system provider to report the location of the first user 600 within the physical merchant location interior 104.

In some embodiments, the user device(s) of the first user 600 may be used to detect explicit actions by the first user that are directed to items and that result in an item identifier being associated with the first user. For example, the first user 600 may use a user device such as, for example, a mobile phone, to scan an item code (e.g., a quick response (QR) code, a universal product code (UPC), etc.), capture an image of a product, and/or otherwise retrieve information about a item that may then be stored in the user device or transmitted to a system provider device as part of a wish list of items that the first user 600 is interested in. In one embodiment, the capture of item information by the user device for addition to a wish list results in any information available about the item (from a scanned code, an image, etc.) being sent from the user device to the system provider device over the network, and the association module included in the system provider device associating an item identifier that identifies the item type of that item with the first user 600 in a storage module such as a database or other non-transitory memory. In some examples, the item type identified by the item identifier may include any details about the item provided by the user device including, for example, the size, color, user rating, price, and/or other item type information. As discussed below, that item type information may be used to identify the same item at a merchant and/or similar items at a merchant.

In some embodiments, the user device(s) of the first user 600 may be used to detect implicit actions by the first user that are directed to items and that result in an item identifier being associated with the first user 600. For example, the handling of items by the first user 600 may be detected and/or reported by the user devices and used to associate item identifiers with the first user 600. Referring now to FIG. 6*b*, a first-person view 602 is provided that illustrates the view of the first user 600 through a wearable user device (e.g., "smart" glasses such as, for example, Google Glass® available from Google, Inc. of Mountain View, Calif.). The first-person view 602 illustrates the view of the first user 600 adjacent the counter 112*b*, and in the illustrated embodiment includes a hand 600*a* and arm 600*b* of the first user 600. As can be seen in FIG. 6*b*, a wearable user device 604 (e.g., a "smart" watch) is located on the arm 600*b* (i.e., the wrist) of the first user 600, and a wearable user device 606 (e.g., a "smart" ring) is located on the hand 600*a* (i.e., a finger) of the first user 600. In the illustrated embodiment, the hand 600*a* of the first user is holding an item 608 (e.g., an earring) available for purchase at the physical merchant location 100.

In some embodiments, one or more of the user devices of the first user 600 may be activated upon entering the physical merchant location 100 in response to communication with the merchant network communication device 302 via the beacon system. For example, the merchant network communication device 302 may broadcast, using the beacon system, communications that are received by the user devices and utilized by the user devices to activate a monitoring mode that is configured to detect the implicit actions of the first user 600 described herein. As such, upon entering the physical merchant location 100, any or all of the user devices may be in a "sleep" or otherwise reduced power mode, and the communications from the merchant (e.g., BLE communications via the beacon system) may operate to wake those user devices, and those user devices may then enter a monitoring mode in response to the communications received from the merchant. Thus, in some embodiments, user devices may be configured to only monitor implicit actions of the first user 600 in particular merchant locations, and the first user may configure the user devices to define the locations at which their implicit actions should be monitored (i.e., by "waking' when communications from a particular merchant are received).

In an embodiment, the handling of the item 608 by the first user 600 may be an implicit action by the first user 600 that is reported by one or more of the user devices to the system provider device (e.g., through the beacon system). In some embodiments, items in the physical merchant location 100 may include transmitters (e.g., radio frequency identification devices (RFIDs)) or other attached communications devices (e.g., via a tag or sticker) that are configured to communicate with the user devices of the first user 600, as well as with the merchant network communication device 302 (e.g., via the beacon system). Those communications may include any information about the items such as, for example, item identifiers, item price, item location within the physical merchant location 100, etc. In those embodiments, the wearable user devices such as the "smart" watch and the "smart" ring worn by the first user 600 may communicate with the item 608 (and other items like it) to determine when the first user 600 is handling the item 608 and/or to retrieve any item information about those items. In addition, the "smart" glasses worn by the first user 600 may capture images of (as well as communicate with) the item 608. As such, the handling of the item 608 by the first user 600, as illustrated in FIG. 6*b*, may be detected by the user devices of the first user 600 and item information communicated to the system provider device through the network. That item information may then be analyzed by the association module included in the system provider device to determine an item identifier to associate with the first user in the storage module. In some examples, the item type identified by that item identifier may include any details about the item 608 that was handled by the first user including, for example, the size, color, user rating, price, and/or other item type information retrieved from or captured from that item. As discussed below, that item type information may be used to identify the same item at a merchant and/or similar items at a merchant.

In some embodiments, particularly when the first user 600 includes multiple user devices, a user device hierarchy may be established and retrieved by a device hierarchy module included in the system provider device, and then provided to the association module included in the system provider device and used to determine when to associate the user 600 with an item identifier for an item handled by the first user 600. For example, the detection of the first user 600 handling an item by some user devices may "trump" or outweigh the detection of the first user 600 handling an item. In a specific example, detection of the item 608 by the "smart" ring 606 or "smart" watch 604 worn by the first user 600 may be considered to be more reliable than the detection of another item by a user's mobile phone in their pocket, as those wearable user devices are closer to the hand 600*a* of the first user 600 and thus more likely to be indicative of the first user 600 actually handling the item 608. In addition, images of the user handling the item 608 (e.g., captured via "smart" glasses) may be considered to be more reliable than the detection of the item 608 near other wearable user devices. While a few examples have been provided, one of skill in the art in possession of the present disclosure will recognize that a device hierarchies may be developed for any number of user devices based on the accuracy of those devices in indicating whether a user has handled an item, and used to determine a level of confidence that a user has handled an item and/or is interested in that item. In the illustrated embodiment, the detection of the item 608 by the "smart" ring and "smart" watch, as well as the image captured of the first user 600 holding the item 608, may provide a relatively high degree of confidence that the first user 600 is interested in the item 608. Further indications of user interest may include a "smart" ring or "smart" watch actually coming into contact with an item.

In some embodiments, the user devices may determine how long the first user 600 handled the item 600 to develop a degree of confidence that the first user 600 is interested in the item. For example, the first user handling, trying on, or repeatedly returning to handle the item 608 may be detected and interpreted as interest in the item 608. As such, any time-based handling information may be reported to the system provider device and analyzed by the association module included in the system provider device to determine a degree of confidence that the first user is interested in the item 608. In some embodiments, handling of an item for more than a predetermined time or a predetermined number of times may be interpreted as interest in the item, and those predetermined times may differ for different items types. For example, the first user 600 may need to handle jewelry for a predetermined time or a predetermined number of times to be determined to have interest in that jewelry that is/are greater than the predetermined time or predetermined number of times required for the first user to handle clothing in order to be determined to have interest in that clothing. Furthermore, the predetermined time or number of times an item must be handled by a user to determine interest by a user in that item may be user specific. For example, some users may show an interest in most types of jewelry, and thus their predetermined time or number of times needed to express interest may be less than that of a user that has not previously shown an interest in jewelry.

Other types of user devices or user device features may contribute to the degree of confidence that the first user 600 is interested in an item. For example, some user devices may include biometric sensors that detect biometric responses of the first user 600, such as a heart rate, breathing pattern, perspiration level, and/or other biometric responses of the user that may be detected by the "smart" ring, "smart" watch, or other user devices of the first user 600. Those biometric responses may be sent to the system provider device and analyzed by the association module along with the other information received from those user devices to determine a reaction by the user to an item that was looked at, handled, or otherwise involved with an implicit action by the first user 600. As such, an increased heart rate, breathing pattern, or perspiration level may be used to determine that the first user was particularly interested in an item that was handled or viewed, and may result in an item identifier being associated with the first user 600, or a relatively high degree of confidence being assigned to an item identifier that is associated with the first user 600.

In some embodiments, the first user may not need to handle items to have items identifiers associated with them at block 402. For example, the first user 600 may spend a predetermined amount of time in a particular area of the physical merchant location 100 that is associated with an item type (e.g., shoes), and that implicit action may be provided to the system provider device and analyzed by the association module included in the system provider device to determine an interest by the first user 600 in that item type. Similarly, the first user visiting several physical merchant locations that offer the same item type (e.g., shoe stores) may be provided to the system provider device and analyzed by the association module included in the system provider device to determine an interest by the first user 600 in that item type. As such, simply being in the proximity of particular items or item types may be an implicit action by the first user that causes the system provider device to associate the first user with an item identifier that identifies that item type. Similarly as discussed above, in such situations the time spent proximate to a type of item, or the number of stores visited that provide the same item type, may be utilized in determining a degree of confidence that the first user 600 is interested in an item.

In some embodiments, implicit actions may be cross referenced with purchase histories of the first user 600 to determine whether to associate an item identifier with the first user, what type of item identifier to associate with the first user, the degree of confidence that an item identifier associated with the first user is indicative of an item or item type that the first user is actually interested in, and/or a variety of other association/user interest factors known in the art. For example, the system provider may be a payment service provider that has access to purchase histories of the first user 600, and when receiving information from user devices of the first user 600 that indicate interest in an item, the association module may cross reference those purchase histories to determine whether the first user has expressed previous interest in similar items. As such, the item identifier associated with the first user may be selected that identifies an item type that the user has previously expressed interest in, and purchase history information may be used to rule out item types or details that the user has not expressed previous interest in (e.g., certain types of clothing or jewelry).

The association module included in the system provider device may also disassociate item identifiers and users based on the purchase history of those users. For example, a user that was previously associated with an item identifier may purchase an item identified by that item identifier, and upon detecting that purchase by reviewing the purchasing history of that user, the association module included in the system provider device may then disassociate that user from the item identifier that identifies an item or item type that that user just purchased. The association module included in the system provider device may also monitor any items associated with a first user to determine an amount of time that those items have been associated with the first user, may rank those items based on the amount of time they have been associated with the first user, and may disassociate items and the first user if a particular amount of time passes between the initial association and any explicit or implicit action directed toward that item or a similar item or item type.

For example, if a significant amount of time (which may be determined based on the item type, the user, and/or any other time/user interest factors) passes between an implicit or explicit action by the user that results in the association of an item identifier with that user, and that user has not performed subsequent implicit or explicit actions towards that item or item type, that item or item type may be determined to be of relatively low interest to that user and may be disassociated with that user. As such, the association of the user and item identifiers may be dynamically updated based on the passage of time, as the user purchases items, and/or due to a variety of other factors such that the user is not associated with items that they may no longer be interested in.

Thus, at block 402, the association module included in the system provider device associates item identifiers with the first users based on a wide variety of explicit and implicit actions performed by the first user and reported by user devices, merchants, and/or any other entity participating in the gift suggestion system. As discussed above, explicit and implicit actions, as well as other item interest information (e.g., purchase histories, social media posts identifying items the first user is interested in, gift purchases by the first user for other users, etc.) may be utilized to discern items that the first user is interested in such that the first user may be accurately associated with item identifiers identifying the item type of those items. As also discussed above, combinations of this information may be used to determine a degree of confidence of the interest of the first user in any item they are associated with (and particularly with regard to items associate with the first user based on implicit actions by the first user as discussed above), and that degree of confidence may be used to rank the items the first user most likely is interested over items the first user has been determined to be less likely to be interested in. While several specific examples have been provided, one of skill in the art in possession of the present disclosure will recognize how other actions and information may be utilized in determining items a user is interested in and a degree of confidence that the user is interested in those items while remaining within the scope of the present disclosure.

The method 400 then proceeds to block 404 where a second user is detected at a physical merchant location.

Figure 7:
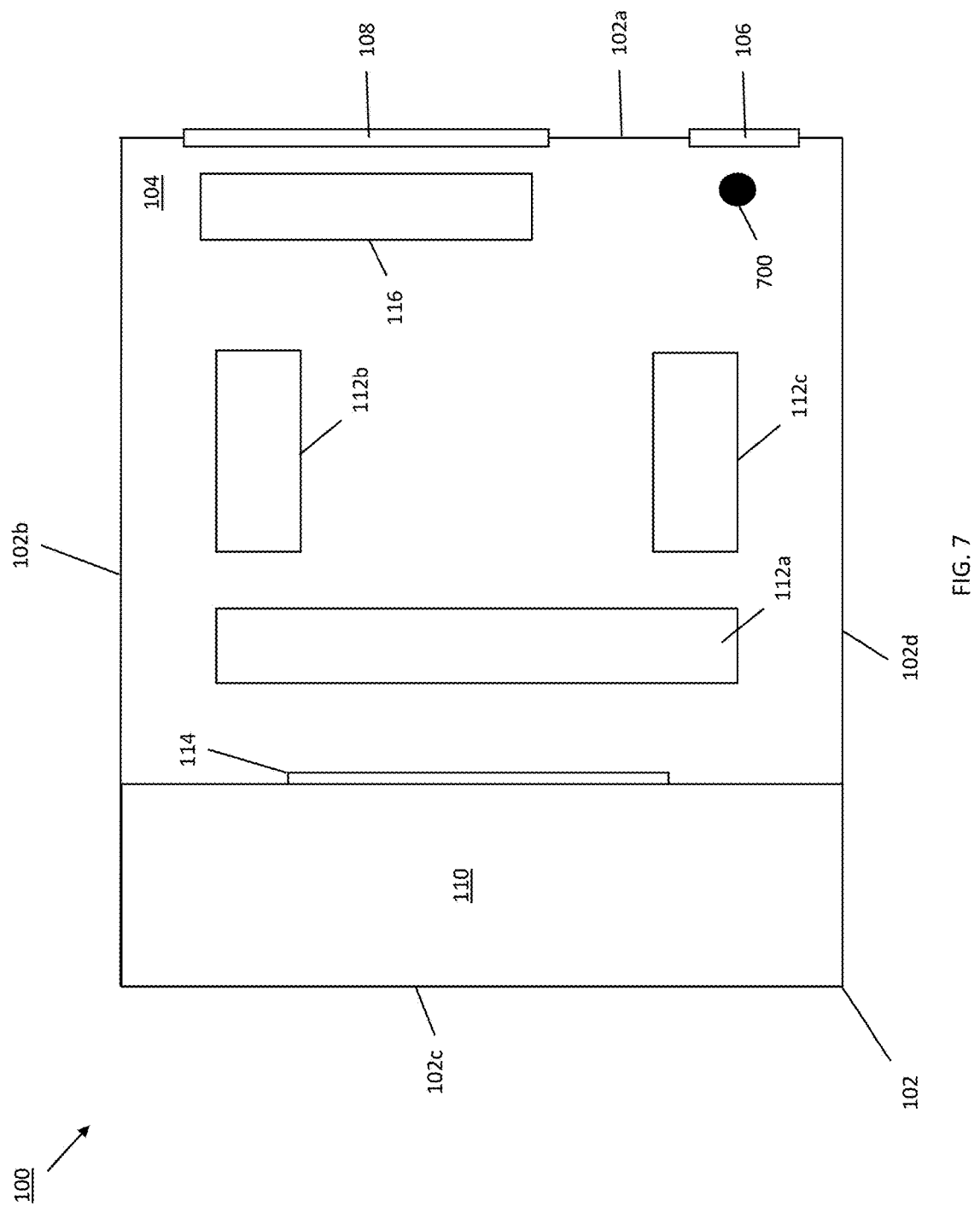
FIG. 7 is a schematic top view illustrating an embodiment of a user located at the physical merchant location of FIG. 1.

Referring now to FIG. 7, an embodiment of a second user 700 (a gift giver in this embodiment) located at the physical merchant location 100 is illustrated. While the second user 700 is illustrated and described below as being located at the same physical merchant location 100 as the first user 600 in FIGS. 6a and 6b, it should be understood that item identifiers may be associated with the first user based on actions by the first user in a physical merchant location that is different than the physical merchant location at which the second user is detected in block 404.

The second user 700 includes a second user device such as, for example, a mobile phone, that may communicate with the system provider device to allow a detection module that is included in the system provider device to detect that the second user is located at the physical merchant location 100. For example, the second user device may include a location determination device that reports the location of the second user device to the system provider device, and the detection module included in the system provider device may determine when the location received from the second user device coincides with a known location of the physical merchant location. In another example, the second user device communicates through the beacon system at the physical merchant location with the system provider device such that the detection module included in the system provider device detects the second user device at the physical merchant location 100. While a few examples of detecting the second user at the physical merchant location 100 have been provided, one of skill in the art in possession of the present disclosure will recognize that the second user may be detected at a location using a variety of techniques that will fall within the scope of the present disclosure. Furthermore, the second user need not be location in the physical merchant location at block 404, but rather may be detected adjacent to or within a predetermined distance of the physical merchant location 100. As such, a second user nearby or passing a physical merchant location may be detected as within a predetermined distance of that physical merchant location during the performance of block 404 of the method 400.

The method 400 then proceeds to block 406 where an association between the first user and the second user is determined. As discussed below, the association between the first user and the second user may be determined in a variety of manners, and while block 406 is illustrated and described as occurring after block 404, block 406 may be performed prior to the detection of the second user at the physical merchant location. Thus, while specific examples of determining the association of the first user and the second user are illustrated and described below, that association may be determined using different techniques and at different times while remaining within the scope of the present disclosure.

Figure 8A:
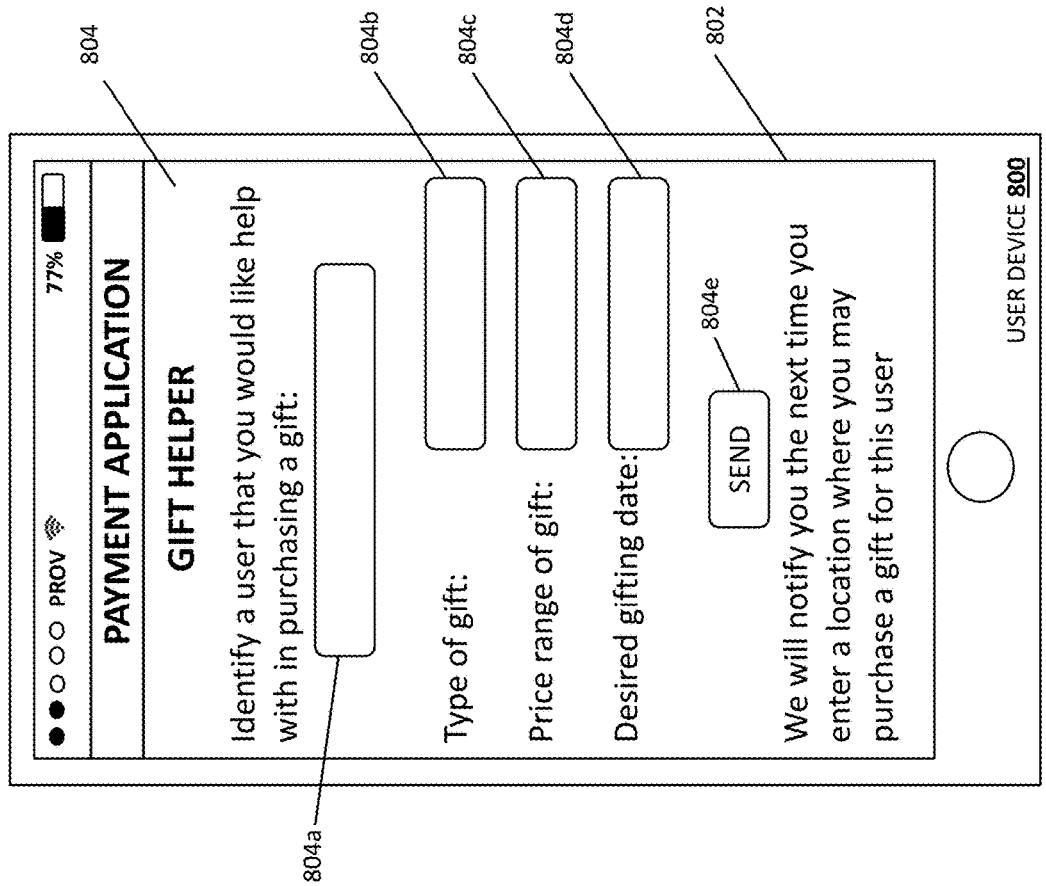
FIG. 8a is a screen shot illustrating an embodiment of a user device displaying a gift suggestion request screen.

Referring now to FIG. 8a, an embodiment of a user device 800 is illustrated that includes a display 802 displaying a gift suggestion request screen 804. In the embodiment discussed below, the user device 800 is a second user device that is operated by a second user (a gift giver), and the gift suggestion request screen 804 is utilized to provide an association between the first user and the second user. Additionally, while the gift suggestion request screen 804 is illustrated as being provided by a payment application, different applications, websites, and/or other user interfaces may be used in providing the gift suggestion request screen 804 while remaining within the scope of the present disclosure.

The gift suggestion request screen 804 includes a first user input box 804a and associated prompt that allows the second user to identify a first user for whom the second user would like to purchase a gift, a gift type input box 804b and associated prompt that allows the second user to identify a gift type that the second user would like to purchase for the first user, a price range input box 804c and associated prompt that allows the second user to identify a price range that the second user would like to spend on the gift for the first user, and a gift date input box 804d and associated prompt that allows the second user to identify a date by which the second user would like to purchase the gift for the first user. The first user may then use the gift suggestion request screen 804 to identify a first user (e.g., by name, email address, phone number, and/or any other user identifier known in the art), identify a type of gift (e.g., a birthday gift, a wedding gift, a baby shower gift, a thank you gift, etc.), identify a price range of the gift (e.g., "$25-50", "under $100", "around $75", etc.), and a gift date (e.g., "before Christmas", "Nov. 15, 2014", etc.) in order to provide details about a first user that they second user for whom the second user would like to purchase a gift. The user may then select a send button 804e to send the information provided on the gift suggestion request screen 804 to the system provider device, which causes the association module included in the system provider device to provide an association between the first user and the second user including any of the information provided by the first user via the gift suggestion request screen 804. As such, the association module included in the system provider device may compile a database in a storage module that associates first users with second users, and any of those associations may then be retrieved and determined by the association module included in the system provider device at block 406.

In another embodiment, the association between the first user and the second user may be determined at block 406 using contact information on the second user device of the second user. For example, upon the second user 700 entering the physical merchant location 100, the second user device may communicate contact information stored in the second user device to the system provider device, and the association module included in the system provider device may then determine that the second user is associated with each first user associated with that contact information.

In another embodiment, the association between the first user and the second user may be determined at block 406 using social network information that may be retrieved using identification and/or authorization information about the second user that is communicated by the second user device. For example, upon the second user 700 entering the physical merchant location 100, the second user device may communicate identification and/or authorization information to the system provider device, and the association module included in the system provider device may use that identification and/or authorization information to access a social network profile of the second user to determine that the second user is associated with the first user through that social network. Social network information used to determine an association between first users and second users may include friend designations, common photos or photos including each other, conversations including each other, and/or a variety of other social network information known in the art.

In another embodiment, the association between the first user and the second user may be determined at block 406 using location information previously retrieved from the second user device and first user devices. For example, first user devices of first users and the second user device of the second user may report their locations to a user location module included in the system provider device periodically, which allows the user location module included in the system provider device to store information related to when the second user device is co-located with first user devices. That co-location information may then be analyzed by the association module included in the system provider device to determine which first users are associated with the second user (e.g., which first user devices share a significant common location history with the second user device such that the first user and the second user may be determined to be associated as friends, relatives, etc.)

While a few examples have been provided, any of a variety of information about and actions by first users and second users may be analyzed by the system provider device to determine that an association exists between the first user and the second user at block 406. Furthermore, combinations of the information about and actions by the first user and the second user discussed above may be used to determine a degree of confidence that a first user is associated with a second user, and that degree of confidence may be required to reach a predetermined level in order to determine an association between the first user and the second user that is used to provide the gift suggestions discussed below. For example, implicit links between users (e.g., being contacts in a mobile phone) may be utilized with other information (e.g., appearance in each other photos on a social network, significant common location histories, etc.) to determine whether gift suggestions for a user to another user are appropriate.

The method 400 then proceeds to block 408 where an item type identified by an item identifier is determined to be available at the physical merchant location. In an embodiment, an item availability module included in the system provider device uses the first user(s) that were determined at block 406 to be associated with the second user 700 that entered the physical merchant location 100 to retrieve item identifier(s) that are associated with those first user(s), and then uses those item identifier(s) to determine whether the physical merchant location 100 provides any item types that are identified by those item identifier(s). For example, a first user that is determined to be associated with the second user at block 408 may also be associated with earrings (e.g., the item 608 in FIG. 6b), and at block 408, the system provider device may determine whether a particular set of earrings and/or similar earrings (item types) are available at the physical merchant location 100.

In an embodiment, the determination by the item availability module included in the system provider device that an item associated with a first user is provided at the physical merchant location 100 may be performed in a variety of ways. For example, the item availability module included in the system provider device may have access to an inventory of the physical merchant location, and at block 408 the item availability module included in the system provider device may retrieve the item identifiers associated with first users to determine whether those items and/or item types are included in the inventory of the physical merchant location 100. In another example, at block 408 the item availability module included in the system provider device may send the item identifiers associated with first users to a merchant device at the physical merchant location 100 such that the merchant device may determine whether those items and/or item types are included in the inventory of the physical merchant location 100, and wait for a confirmation that one of those items is available at the physical merchant location 100. As discussed above, item types identified by item identifiers may include specific information about a specific item associated with a first user, as well as relatively generic information that identifies a type of an item, a style of an item, and/or other item information that may be used to determine a variety of different items that a first user may be interested in.

The method 400 then proceeds to block 410 where a gift suggestion is provided to the second user. At block 410, a gift suggestion module provided by the system provider device may provide a gift suggestion for display to the second user device over a network via, for example, a cellular network, the beacon system at the physical merchant location, and/or using a variety of other network known in the art.

Referring now to FIG. 8b, an embodiment of the second user device 800 is illustrated displaying a gift suggestion screen 806 that, in the illustrated embodiment, is provided in a pop-up window over a lock-screen (i.e., a user interface element that regulates access to the user device 800 by requiring the user perform a certain action in order to gain access). However, the gift suggestion screen 806 may be provided over a home screen, on an application, via a web page, and/or in a variety of other manners known in the art while remaining within the scope of the present disclosure. The gift suggestion screen 806 in the illustrated embodiment includes an a first user identifier that explains to the second user that they have been detected in a location that provides items that the first user is interested in, and thus would make a good gift for the first user. The gift suggestion screen 806 in the illustrated embodiment also includes an item identifier and price 806b, an item image 806c, and an item details button 806d that the second user may select to retrieve further details about the item. Furthermore, the gift suggestion screen 806 may include any other information the gift suggestion module included in the system provider device has received about the item, and/or any information that the gift suggestion module included in the system provider device is able to retrieve about the item.

In some embodiments, the gift suggestion screen 806 may include a plurality of items that are associated with the first user and that are provided at the physical merchant location 100, and those items may be ranked by, for example, items explicitly selected by the first user, items implicitly selected by the first user that are associated with a relatively high degree of confidence, and items implicitly selected by the first user that are associated with a relatively low degree of confidence. As such, the second user may be able to review more than one item that is associated with the first user and that is also available at the physical merchant location 100 using the gift suggestion screen 806.

Figure 8C:
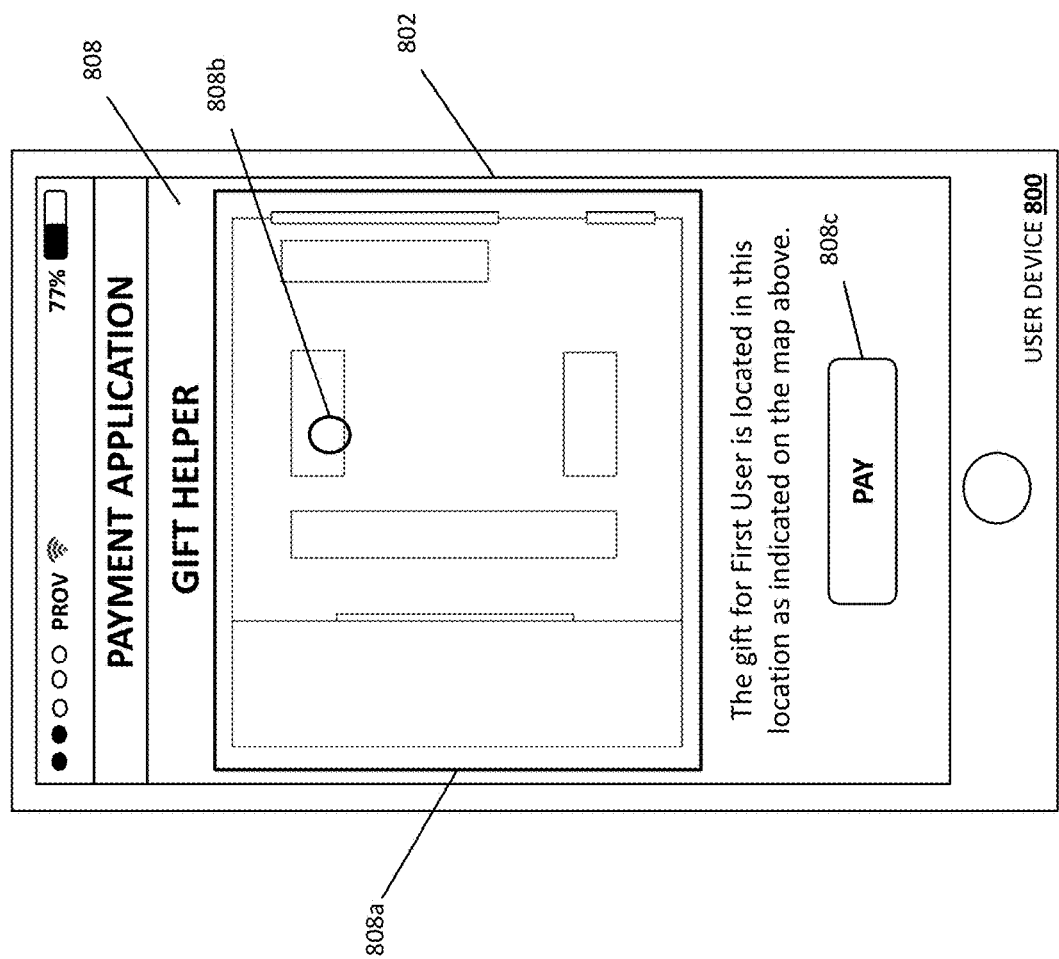
FIG. 8c is a screen shot illustrating an embodiment of a user device displaying a gift suggestion screen.

Referring now to FIG. 8c, an embodiment of the second user device 800 is illustrated displaying an item details screen 808 that, in the illustrated embodiment, may be provided in response to the user selecting the item details button 806d on the gift suggestion screen 806. The item details screen 808 includes a map 808a of the physical merchant location 100, an item indicator 808b located over the map 808a and indicating the relative position of the item in the physical merchant location 100, along with a pay button 808c that the second user may select to begin a payment process to purchase the item for the first user. Thus, the second user may use the item details screen 808 to determine where in the physical merchant location 100 the item for the first user can be found, and to begin the payment process for that item as well. While a specific item details screen has been illustrated and described that helps the second user determine the location of the item in the physical merchant location and pay for that item, other item details may be provided to the second user on the item details screen such as, for example, inventory information, similar item information, and/or a variety of other item information known in the art while remaining within the scope of the present disclosure.

Figure 8D:
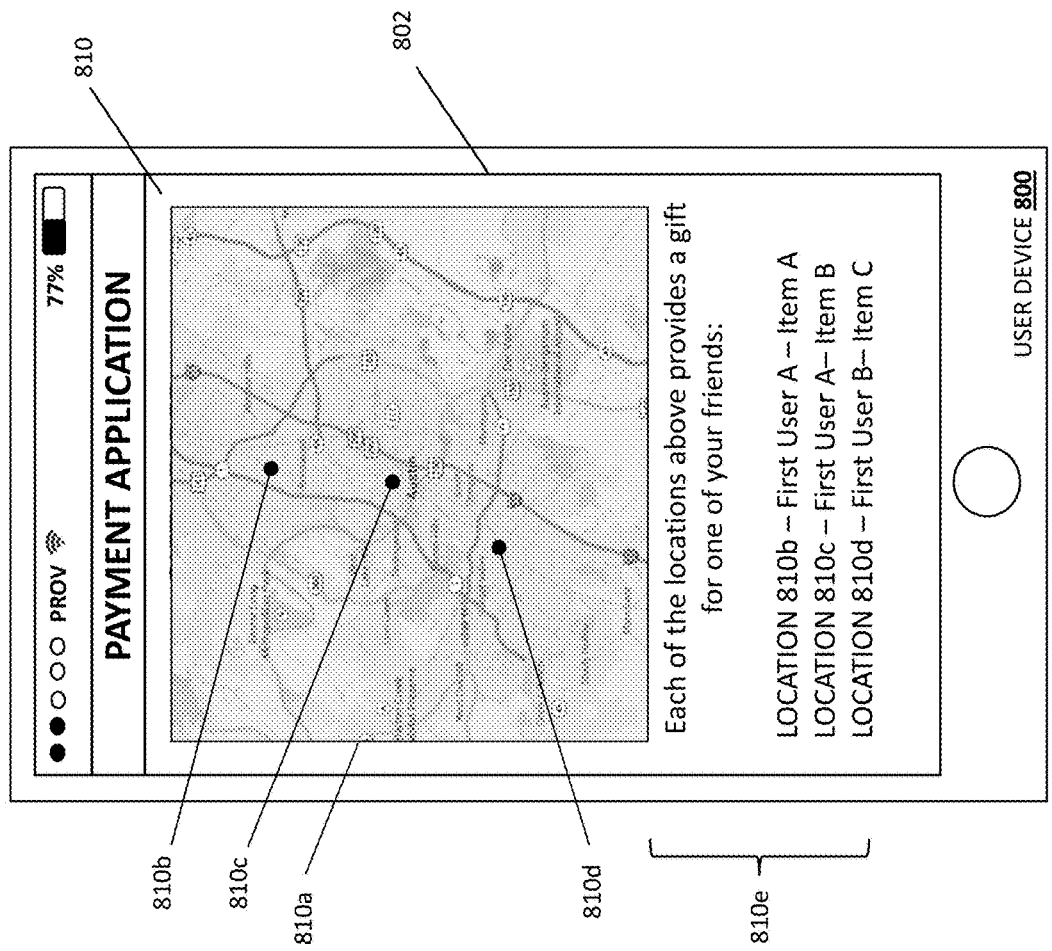
FIG. 8d is a screen shot illustrating an embodiment of a user device displaying a gift suggestion screen.

Furthermore, while specific examples of the systems and methods provided above, other embodiments of the systems and methods determine merchants that are close to the second user (e.g., within a predetermined distance from the second user while the user is driving, located in a shopping mall, etc.) and determine whether any of those merchant provide items associated with first users that are connected to the second user. The systems and methods may then present each of the merchants that provide items that are good gifts for the first user to the second user. For example, FIG. 8d illustrates an embodiment of the second user device 800 displaying a gift suggestion screen 810 that, in the illustrated embodiment, may be provided by the gift suggestion module included in the system provider device in response to a request from the second user (e.g., a request to provide any physical merchant locations that are close and that provide gifts a friend or friends are interested in). The gift suggestion screen 810 includes a map 810a and a plurality of physical merchant location indicators 810b, 810c, and 810d that indicate the relative locations of physical merchant locations on the map 810a. The gift suggestion screen 810 also includes a gift description section 810e that identifies the location where each gift item can be purchased, the first user for which that gift item is associated with, and details about that gift item. The second user may review the gift suggestion screen 810 to determine whether to travel to any of the physical merchant locations identified by the physical merchant location identifiers 810b-d and purchase one or more gifts for one or more first users.

In yet another embodiment, the detection module included in the system provider device may detect that the second user second user, rather than being located at a physical merchant location, is "located" at a merchant website (i.e., directing an Internet browser on their second user device to a website operated by a merchant that provides items for sale). The item availability module in the system provider device may then determine that an item type that is identified by an item identifier associated with a first user who is a friend of the second user is available at the website. The gift suggestion module may then provide a gift suggestion for display on the second user device that identifies the first user and the item type that is available through the website. As such, a second user browsing items available at a merchant website may be alerted that that website provides items that would be good gifts for other first user that are associated with that second user. Furthermore, merchant websites may include websites operated by merchants (e.g., a merchant website operated by a clothing merchant), and may include websites operated on behalf of merchants (e.g., an auction website that allows merchants to list and sell products such as, for example, EBay.com provided by EBay, Inc. of San Jose, Calif.

Thus, gift suggestion systems and methods have been described that may operate to determine which items a first user is interested in by monitoring implicit actions of the first user towards items and associating those items with the first user. When a second user that is associated with the first user enters a physical merchant location, the presence of the second user is detected at that physical merchant location is detected, and the association with the first user is determined such that it may be determined whether the items associated with the first user are available at the physical merchant location. If so, the second user may be notified such that the second user may purchase one or more of those items for the first user as a gift. As such, gift items that a first user may be interested in are compiled and suggested to second users when they are at locations where those gift items may be purchased. Such systems and methods may determine gift items for first users without any interaction by the first user, and may suggest those gift items to second users only when they enter a physical merchant location that provides them, thus greatly simplifying the gift purchasing process for the second user while increasing the likelihood that the first user will receive a gift that they are interested in.

A specific use case of the gift suggestion system will now be described, but this example should not be interpreted as limiting, as variations according to any of the embodiments discussed above will provided benefits in different use cases and thus will fall within the scope of the present disclosure. In this use case, the first user and the second user are married and have a wedding anniversary approaching. Over the months preceding that wedding anniversary, the gift suggestion system retrieves and compiles item information about the first user, including items viewed on merchant websites, physical merchant locations visited, item handled in physical merchant locations, social media posts about items, and/or virtually any actions taken by the first user and directed towards an item, and associates that item information with the first user. The gift suggestion system may then determine that the date of the wedding anniversary is close by reviewing information associated with both the first user and/or the second user such as calendars, social media profiles, social media posts, etc., and, in response, determine that the second user will likely want to purchase an item for the first user soon. Subsequent to that determination, the gift suggestion system will monitor the location of the second user to detect when the second user is located at or near physical merchant locations that provides items that the first user has expressed interest in, and when the second user is at or near physical merchant locations that provide such items (and particularly items that the system has determined the first user has expressed a high degree of interest in), the gift suggestion system will alert the second user that they may purchase a wedding anniversary gift for the first user at or near their current location. Thus, the second user may conveniently be alerted when they are near a location that provides a gift that the first user would like for their wedding anniversary, freeing that second user of having to research items for purchase for the second user or even needing to remember that the wedding anniversary date is approaching.

Figure 9:
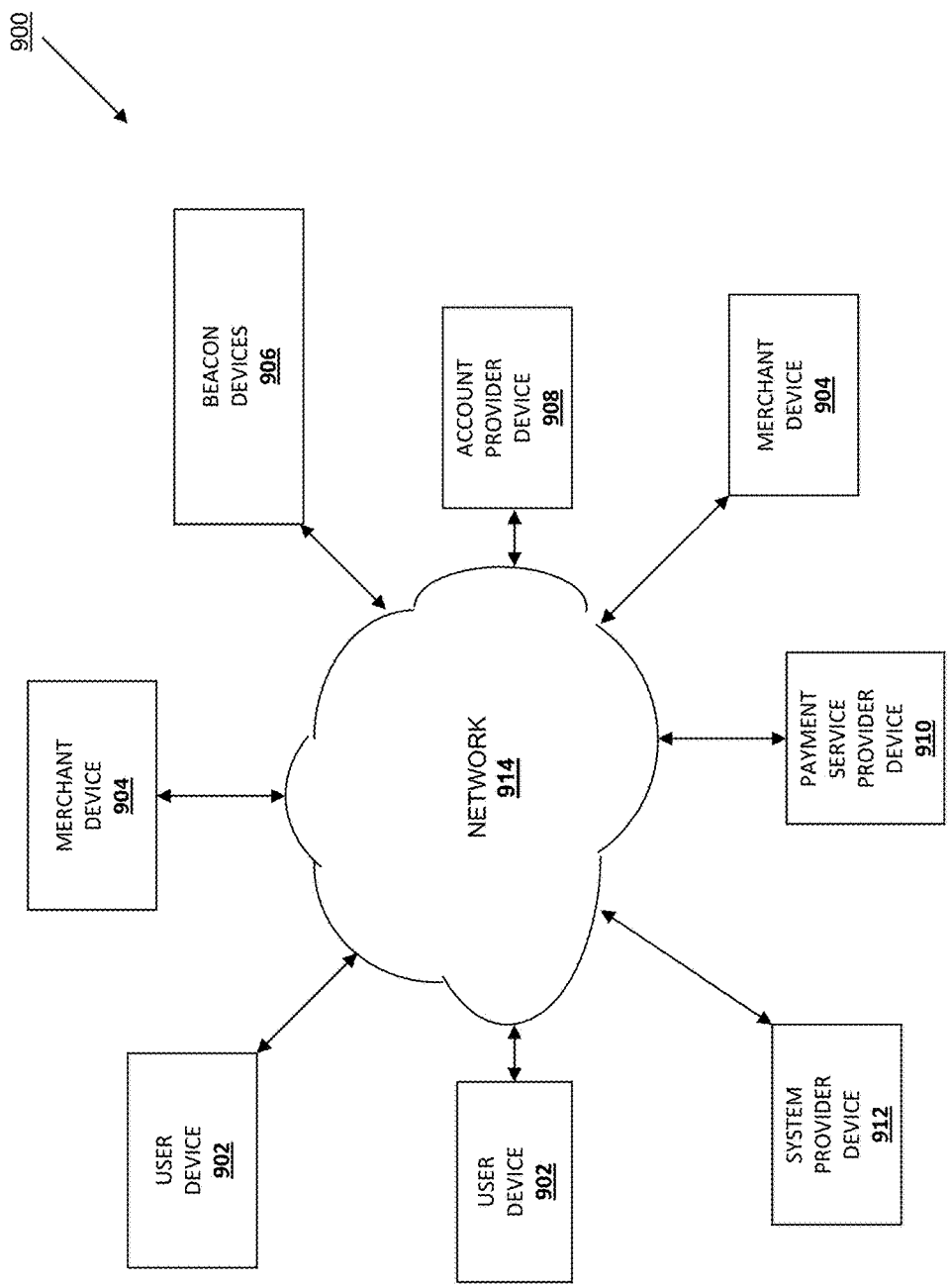
FIG. 9 is a schematic view illustrating an embodiment of a networked system.

Referring now to FIG. 9, an embodiment of a network-based system 900 for implementing one or more processes described herein is illustrated. As shown, the network-based system 900 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 9 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 900 illustrated in FIG. 9 includes a plurality of user devices 902, a plurality of merchant devices 904, a plurality of beacon devices 906, a plurality of account provider devices 908, a payment service provider device 910, and/or a system provider device 912 in communication over one or more networks 914. The user devices 902 may be the user devices and/or wearable user devices discussed above and may be operated by the users discussed above. The merchant devices 904 and/or beacon devices 906 may be the merchant devices and/or beacon devices discussed above and may be operated by the merchants discussed above. The account provider devices 908 may be the account provider devices discussed above and may be operated by the account providers discussed above. The payment service provider device 910 may be the payment service provider devices discussed above and may be operated by a payment service provider such as, for example, PayPal Inc. of San Jose, Calif. The system provider devices 912 may be the system provider devices discussed above and may be operated by the system providers discussed above.

The user devices 902, merchant devices 904, beacon devices 906, account provider devices 908, payment service provider device 910, and/or system provider device 912 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 900, and/or accessible over the network 914.

The network 914 may be implemented as a single network or a combination of multiple networks. For example, in various embodiments, the network 914 may include the Internet and/or one or more intranets, landline networks, wireless networks, and/or other appropriate types of networks.

The user devices 902 may be implemented using any appropriate combination of hardware and/or software configured for wired and/or wireless communication over network 914. For example, in one embodiment, the user devices 902 may be implemented as a personal computer of a user in communication with the Internet. In other embodiments, the user devices 902 may be a smart phone, personal digital assistant (PDA), laptop computer, and/or other types of computing devices.

The user devices 902 may include one or more browser applications which may be used, for example, to provide a convenient interface to permit the user to browse information available over the network 914. For example, in one embodiment, the browser application may be implemented as a web browser configured to view information available over the Internet.

The user devices 902 may also include one or more toolbar applications which may be used, for example, to provide user-side processing for performing desired tasks in response to operations selected by the user. In one embodiment, the toolbar application may display a user interface in connection with the browser application.

The user devices 902 may further include other applications as may be desired in particular embodiments to provide desired features to the user devices 902. In particular, the other applications may include a payment application for payments assisted by a payment service provider through the payment service provider device 910. The other applications may also include security applications for implementing customer-side security features, programmatic customer applications for interfacing with appropriate application programming interfaces (APIs) over the network 914, or other types of applications. Email and/or text applications may also be included, which allow user payer to send and receive emails and/or text messages through the network 914. The user devices 902 includes one or more user and/or device identifiers which may be implemented, for example, as operating system registry entries, cookies associated with the browser application, identifiers associated with hardware of the user devices 902, or other appropriate identifiers, such as a phone number. In one embodiment, the user identifier may be used by the payment service provider device 910 to associate the user with a particular account as further described herein.

The merchant devices 904 may be maintained, for example, by a conventional or on-line merchant, conventional or digital goods seller, individual seller, and/or application developer offering various products and/or services in exchange for payment to be received conventionally or over the network 914. In this regard, the merchant devices 904 may include a database identifying available products and/or services (e.g., collectively referred to as items) which may be made available for viewing and purchase by the user.

The merchant devices 904 also include a checkout application which may be configured to facilitate the purchase by the payer of items. The checkout application may be configured to accept payment information from the customer through the user devices 902 and/or from the payment service provider through the payment service provider device 910 over the network 914.

Figure 10:
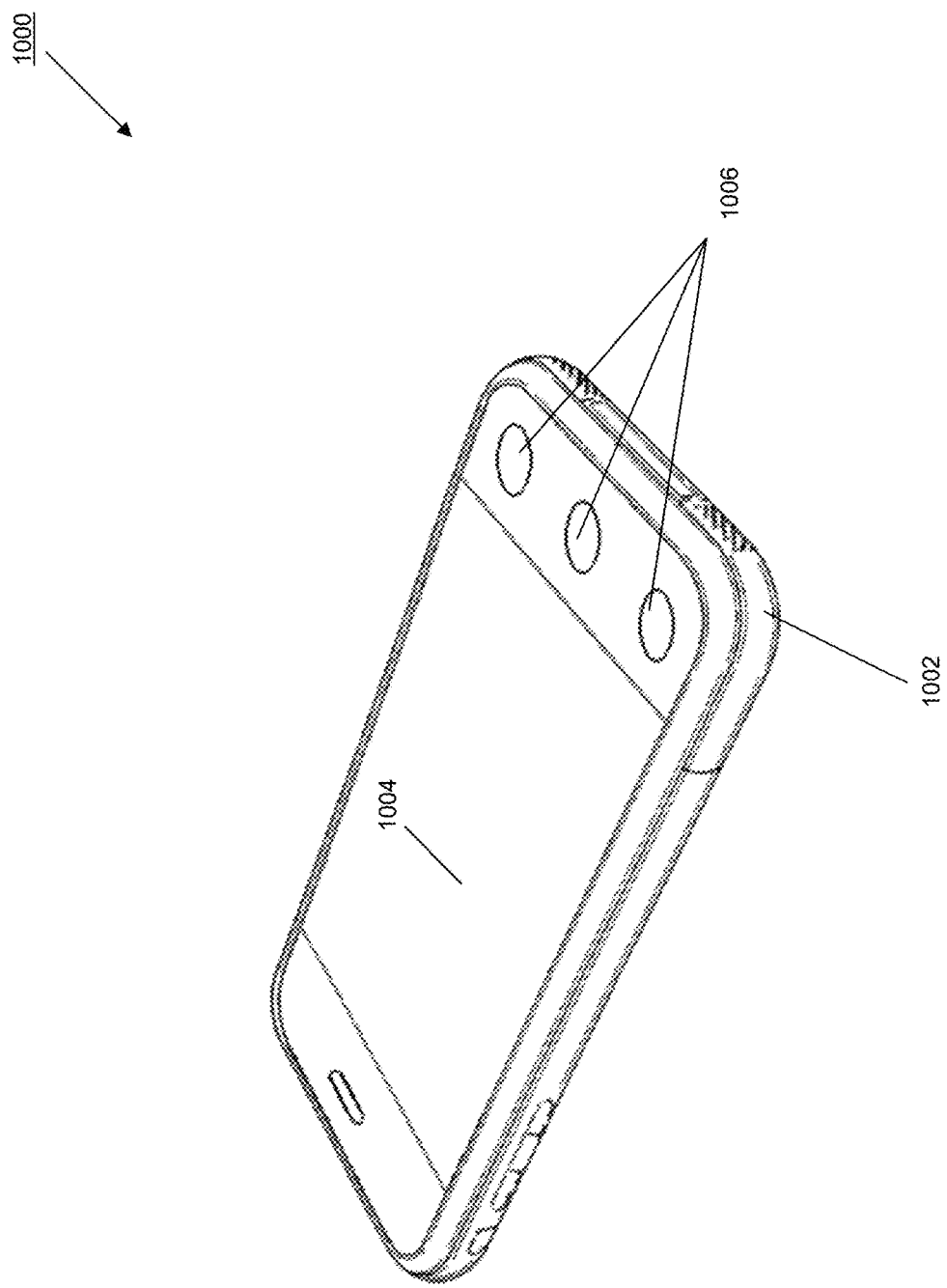
FIG. 10 is a perspective view illustrating an embodiment of a user device.

Referring now to FIG. 10, an embodiment of a user device 1000 is illustrated. The user device 1000 may be the user devices discussed above. The user device 1000 includes a chassis 1002 having a display 1004 and an input device including the display 1004 and a plurality of input buttons 1006. One of skill in the art will recognize that the user device 1000 is a portable or mobile phone including a touch screen input device and a plurality of input buttons that allow the functionality discussed above with reference to the methods above. However, a variety of other portable/mobile user devices and/or desktop user devices may be used in the methods discussed above without departing from the scope of the present disclosure.

Figure 11:
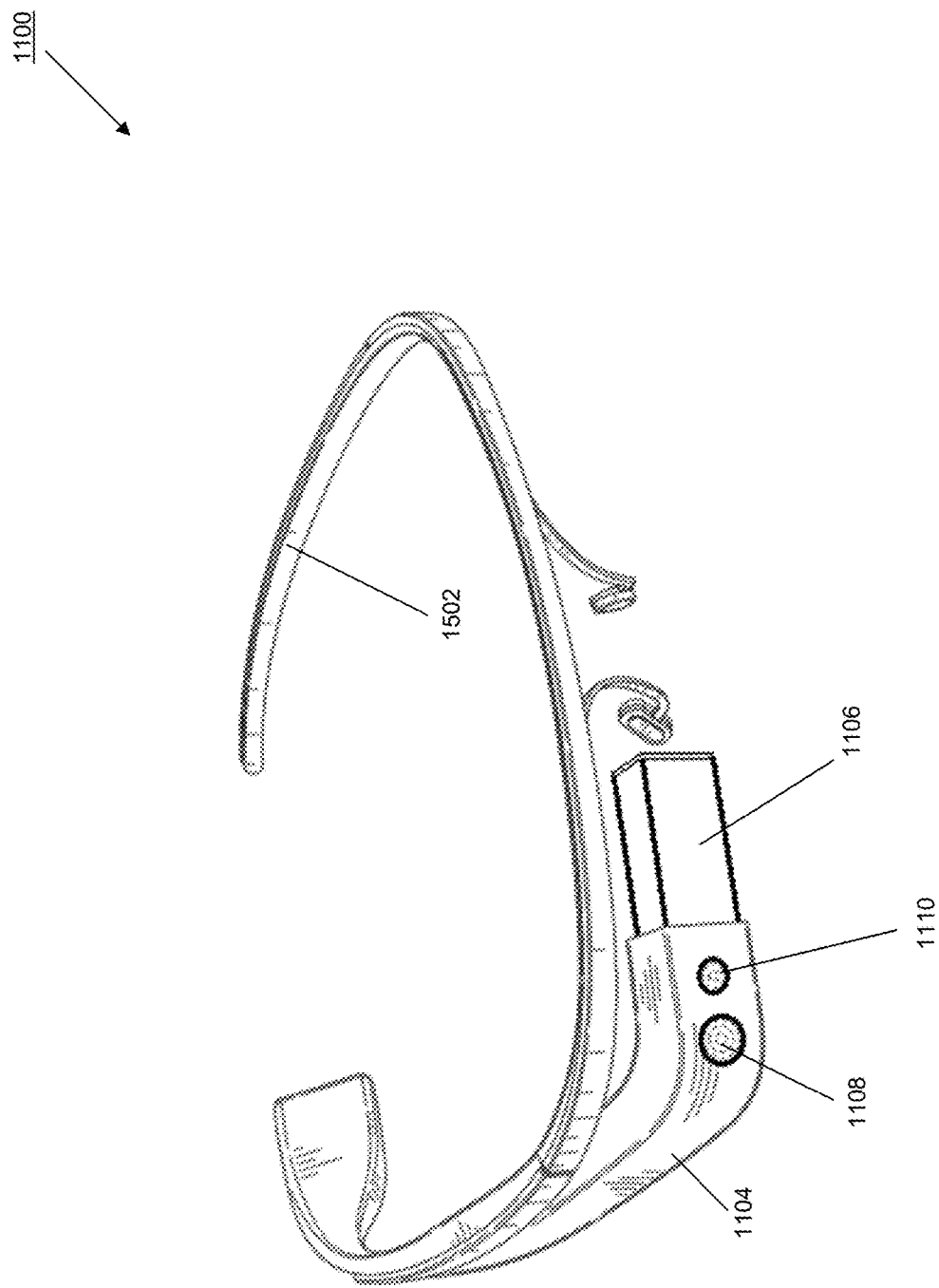
FIG. 11 is a perspective view illustrating an embodiment of a wearable device.
Figure 12:
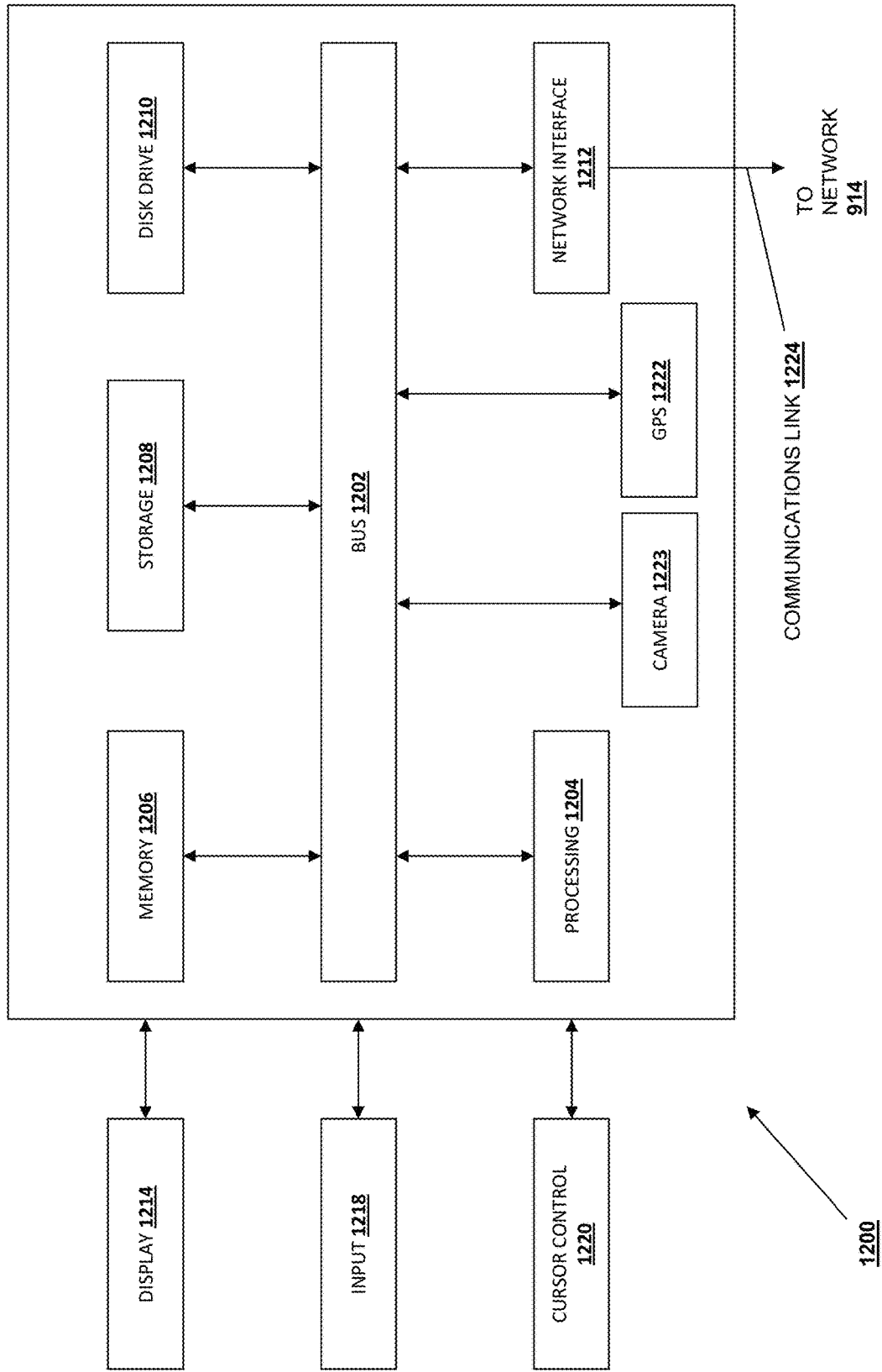
FIG. 12 is a schematic view illustrating an embodiment of a computer system.

Referring now to FIG. 11, an embodiment of a wearable device 1100 is illustrated. The wearable device 1100 may be the may be the wearable user devices, discussed above. The wearable device 1100 includes a frame 1102 having a computing chassis 1104 that extends from the frame 1102, a display device 1106 that extends from the computing chassis 1104, a microphone 1108 located on the computing chassis 1104, and a camera 1110 located on the computing chassis 1104. One of skill in the art will recognize that the wearable merchant device 1100 is a mobile wearable merchant device such as, for example, Google Glass® available from Google Inc. of Mountain View, Calif. that may provide a user with the functionality discussed above with reference to the methods discussed above. However, a variety of other mobile wearable devices (e.g., smart watches, smart rings, etc.) may be used in the methods discussed above without departing from the scope of the present disclosure Referring now to FIG. 12, an embodiment of a computer system 1200 suitable for implementing, for example, the user devices, merchant devices, beacon devices, account provider devices, payment service provider device, and/or system provider device, is illustrated. It should be appreciated that other devices utilized by users, merchants, beacon devices, other devices, payment service providers, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), a location determination component 1222 (e.g., a Global Positioning System (GPS) device as illustrated, a cell tower triangulation device, and/or a variety of other location determination devices known in the art), and/or a camera component 1223. In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the user devices, merchant devices, beacon devices, other devices, payment service provider devices, and/or system provider devices. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 914 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
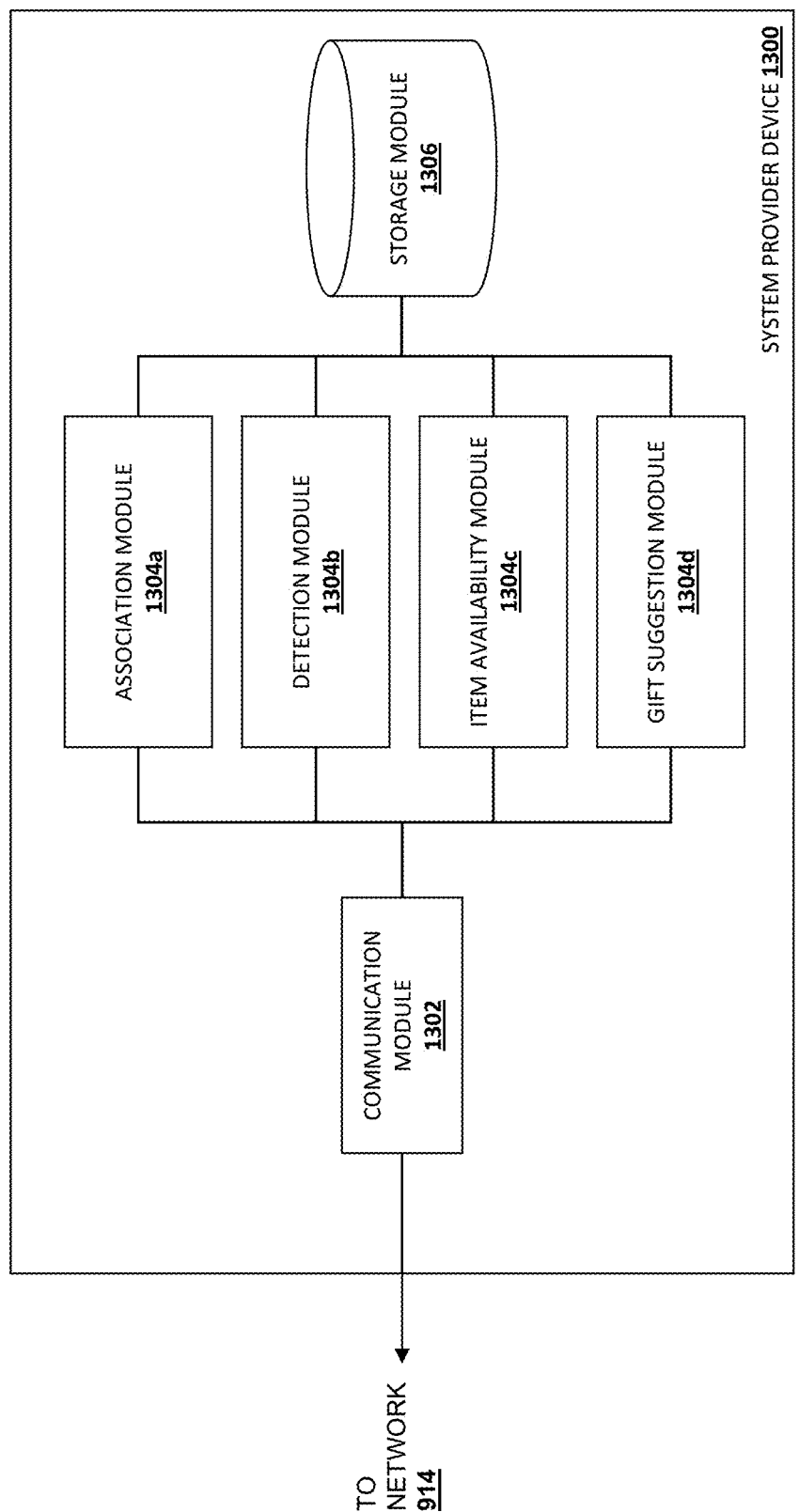
FIG. 13 is a schematic view illustrating an embodiment of a system provider device.

Referring now to FIG. 13, an embodiment of a system provider device 1300 is illustrated. In an embodiment, the device 1300 may be the system provider devices discussed above. The device 1300 includes a communication module 1302 that is coupled to the network 914 and to any or all of an association module 1304a, a detection module 1304b, an item availability module 1304c, and a gift suggestion module 1304d, any of which may be coupled to a storage module 1306. Any or all of the modules 1302 and 1304a-d may be implemented as a subsystem of the system provider device including for example, a circuit, a hardware component, a hardware subcomponent, and/or a variety of other subsystems known in the art. Furthermore, any or all of the modules 1302 and 1304a-d may be preconfigured to perform their disclosed functionality, or may be configured by a processing system "on-the-fly" or as needed to perform their disclosed functionality. As such, any or all of the modules 1302 and 1304a-d may include pre-configured and dedicated circuits and/or hardware components of the system provider device 1300, or may be circuits and/or hardware components that are configured as needed.

For example, any or all of the modules 1302 and 1304a-d may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules 1302, 1304a, 1304b, 1304c, and/or 1304d to perform the functions described above. As such, in some embodiments, preconfigured and dedicated circuits may be implemented to perform the functions of the modules 1302, 1304a, 1304b, 1304c, and/or 1304d. In other embodiments, a processing system may execute instructions on a non-transitory, computer-readable medium to configure one or more circuits as needed to perform the functions of the modules 1302, 1304a, 1304b, 1304c, and/or 1304d.

The communication module 1302 may be included as a separate module provided in the device 1300, or may be provided using instructions stored on a computer-readable medium that, when executed by a processing system in the device 1300, configure the communication module 1302 to send and receive information over the network 914, as well as provide any of the other functionality that is discussed above. The association module 1304a may be included as a separate module provided in the device 1300, or may be provided using instructions stored on a computer-readable medium that, when executed by a processing system in the device 1300, configure the association module 1304a to associate first users and second users in the storage module 1306, associate item identifiers with first users in the storage module 1306, retrieve associations from the storage module 1306, as well as provide any of the other functionality that is discussed above. The detection module 1304*b* may be included as a separate module provided in the device 1300, or may be provided using instructions stored on a computer-readable medium that, when executed by a processing system in the device 1300, configure the detection module 1304*b* to detect when second users are located in physical merchant locations, as well as provide any of the other functionality that is discussed above.

The item availability module 1304*c* may be included as a separate module provided in the device 1300, or may be provided using instructions stored on a computer-readable medium that, when executed by a processing system in the device 1300, configure the item availability module 1304*c* to determine that item types identified by item identifiers are available at physical merchant locations, as well as provide any of the other functionality that is discussed above. The gift suggestion module 1304*d* may be included as a separate module provided in the device 1300, or may be provided using instructions stored on a computer-readable medium that, when executed by a processing system in the device 1300, configure the gift suggestion module 1304*d* to provide gift suggestions for display on second user devices, as well as provide any of the other functionality that is discussed above. Furthermore, other modules discussed above but not illustrated in FIG. 13 may be provided as separate modules on the device 1300, or using instructions stored on a computer-readable medium similarly as discussed above. While the storage module 1306 has been illustrated as located in the device 1300, one of skill in the art will recognize that it may include multiple storage modules and may be connected to the modules 1304*a*-*d* through the network 914 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory storing an association between a first user and a second user; and
    one or more hardware processors coupled to the non-transitory memory and configured to execute instructions to cause the system to perform operations comprising:
        detecting, using a first wireless network protocol, that a first user device associated with the first user is within a first physical merchant location;
        in response to detecting that the first user is within the first physical merchant location, instructing the first user device to change from an inactive operation mode to an active operation mode;
        monitoring, via the first user device based on the active operation mode, actions performed by the user inside the first physical merchant location to detect interactions of the first user with items within the first physical merchant location;
        in response to detecting that the first user has performed an action with a first item:
            instructing the first user device to begin monitoring sensor data related to the first item, obtained over a second wireless network protocol from a first set of sensors, over a continuous period of time to derive a first sequence of interactions between the first user and the first item, and
            monitoring biometric data of the first user, obtained from a second set of sensors of the first user device, during the first sequence of interactions to determine correlations between biometric responses of the first user and the first sequence of interactions between the first user and the first item;
        determining an interest level of the first user toward an item type associated with the first item based at least in part on the derived first sequence of interactions and the determined correlations between the biometric responses of the first user and the first sequence of interactions;
        in response to detecting that a second user device of the second user is located at a second physical merchant location, determining that a second item associated with the item type is available for sale at the second physical merchant location; and
        instructing, over a network using the first wireless network protocol, the second user device to present a gift suggestion that identifies the first user and the second item based on the stored association between the first and second users and the determined interest level.

2. The system of claim 1, wherein the first sequence of interactions includes at least one of the first user physically handling the first item for a duration of time or the first user viewing the first item for a duration of time, wherein determining the interest level is further based on the duration of time.

3. The system of claim 1, wherein the operations further comprise:
  determining a ranking for each sensor in the first set of sensors according to a reliability of each sensor to indicate an interest of the user regarding the first item; and
  assigning different weights to the sensor data retrieved from each of the first set of sensors according to the ranking.

4. The system of claim 1, wherein the operations further comprise:
  detecting a second sequence of interactions between the first user and the first item; and
  modifying the interest level based on the second sequence of interactions.

5. The system of claim 4, wherein the second sequence of interactions comprises a purchase of the first item by the first user, and wherein modifying the interest level comprises reducing the interest level of the first user regarding the item type.

6. The system of claim 1, wherein the second physical merchant location is different than the first physical merchant location.

7. A method comprising:
  detecting, by one or more hardware processors using a first wireless network protocol, that a first user device associated with a first user is within a first physical merchant location;
  in response to detecting that the first user is within the first physical merchant location, instructing, by the one or more hardware processors, the first user device to change from an inactive operation mode to an active operation mode;
  monitoring, by the one or more hardware processors via the first user device based on the active operation mode, actions performed by the user inside the first physical merchant location to detect interactions of the first user with items within the first physical merchant location;
  in response to detecting that the first user has performed an action with a first item:
    instructing, by the one or more hardware processors, the first user device to begin monitoring sensor data related to the first item, obtained from a first set of sensors of the first user device over a second wireless protocol, over a continuous period of time to derive a first sequence of interactions between the first user and the first item, and
    monitoring, by the one or more hardware processors, biometric data of the first user, obtained from a second set of sensors of the first user device, during the first sequence of interactions to determine correlations between biometric responses of the first user and the first sequence of interactions between the first user and the first item;
  determining, by the one or more hardware processors, an interest level of the first user toward an item type associated with the first item based at least in part on the derived first sequence of interactions and the determined correlations between the biometric responses of the first user and the first sequence of interactions;
  in response to detecting that a second user device of a second user is located at a physical merchant location, determining, by the one or more hardware processors, that a second item associated with the item type is available for sale at the second physical merchant location; and
  instructing, by the one or more hardware processors over a network through a network interface, the second user device to present a gift suggestion that identifies the first user and the second item based on the generated interest profile.

8. The method of claim 7, wherein the first sequence of interactions includes the first user physically handling the first item, and wherein determining the interest level comprises increasing the interest level when the determined correlations comprise a correlation between a positive biometric response and the first user physically handling the first item.

9. The method of claim 7, wherein the first user device comprises a wearable user device attached to one of an arm or a hand of the first user.

10. The method of claim 7, further comprising:
  determining, by the one or more hardware processors using purchasing information received over the network through the network interface, that the first user has purchased the first item; and
  reducing, by the one or more hardware processors, the interest level of the first user toward the item type.

11. The method of claim 7, further comprising:
  detecting, by the one or more hardware processors, that the first user has performed an action with a third item in a third physical merchant location, wherein the third item is associated with the item type;
  deriving, by the one or more hardware processors, a second sequence of interactions between the first user and the third item based on sensor data obtained from the first set of sensors; and
  modifying the interest level based on the derived second sequence of interactions.

12. The method of claim 11,
  wherein the second sequence of interactions comprise the first user viewing a webpage about the third item for a duration of time, and wherein modifying the interest level comprises increasing the interest level of the first user toward the item type when the duration of time exceeds a predetermined threshold.

13. The method of claim 7, wherein the second physical merchant location is different than the first physical merchant location.

14. A non-transitory machine-readable medium having stored thereon machine-readable instructions executable to cause a machine to perform operations comprising:
  detecting, using a first wireless network protocol, that a first user device associated with a first user is within a first physical merchant location;
  in response to detecting that the first user is within the first physical merchant location, instructing the first user device to change from a reduced power operation mode to a monitoring operation mode;
  monitoring, via the first user device based on the monitoring operation mode, actions performed by the user inside the first physical merchant location to detect interactions of the first user with items within the first physical merchant location;
  in response to detecting that the first user has performed an action with a first item:
    instructing the first user device to begin monitoring sensor data related to the first item, obtained over a second wireless protocol from a first set of sensors, over a continuous period of time to derive a first sequence of interactions between the first user and the first item, and monitoring biometric data of the first user, obtained from a second set of sensors of the first user device, during the first sequence of interactions to determine correlations between biometric responses of the first user and the first sequence of interactions between the first user and the first item;

determining an interest level of the first user toward an item type associated with the first item based at least in part on the derived first sequence of interactions and the determined correlations between the biometric responses of the first user and the first sequence of interactions;

in response to detecting that a second user device of a second user is located at a second physical merchant location, determining that a second item associated with the item type is available for sale at the second physical merchant location; and instructing the second user device to present a gift suggestion that identifies the first user and the second item based on the determined interest level.

15. The non-transitory machine-readable medium of claim 14, wherein the first sequence of interactions includes the first user physically handling the first item for a duration of time, and wherein determining the interest level is further based on the duration of time.

16. The non-transitory machine-readable medium of claim 14, wherein the operations further comprise:

accessing a social network server associated with a social network of the second user to determine that the first user and the second user are related within the social network; and in response to a determination that the first user and the second user are related in the social network, generating an association between the first user and the second user in the database.

17. The non-transitory machine-readable medium of claim 14, wherein the first sequence of interactions includes the first user viewing the first item for a number of times, wherein determining the interest level is further based on the number of times.

18. The non-transitory machine-readable medium of claim 14, wherein the operations further comprise:

in response to a determination that a predetermined duration of time has passed after the first sequence of interactions, reducing the interest level of the first user regarding the item type.

19. The non-transitory machine-readable medium of claim 14, wherein the first sequence of interactions includes the first user viewing the first item in the first physical merchant location, wherein determining the interest level comprises increasing the interest level when the determined correlations comprise a correlation between a positive biometric response and the first user viewing the first item.

20. The non-transitory machine-readable medium of claim 14, wherein the operations further comprise monitoring communication of data between the first user device and an electronic device associated with the first item to derive the first sequence of interactions.

* * * * *